United States Patent
Kerschbaum et al.

(10) Patent No.: US 7,986,780 B2
(45) Date of Patent: *Jul. 26, 2011

(54) PRIVACY-PRESERVING SUBSTRING CREATION

(75) Inventors: Florian Kerschbaum, Karlsruhe (DE); Luciana Moreira Sa de Souza, Karlsruhe (DE)

(73) Assignee: SAP AG, Walldorf (DE)

( * ) Notice: Subject to any disclaimer, the term of this patent is extended or adjusted under 35 U.S.C. 154(b) by 1125 days.

This patent is subject to a terminal disclaimer.

(21) Appl. No.: 11/482,262

(22) Filed: Jul. 6, 2006

(65) Prior Publication Data

US 2008/0019510 A1 Jan. 24, 2008

(51) Int. Cl.
 *H04K 1/04* (2006.01)
 *G06F 11/30* (2006.01)
(52) U.S. Cl. ............. 380/37; 712/300; 380/29; 380/42; 713/162; 713/189
(58) Field of Classification Search .................... 380/37; 713/189
 See application file for complete search history.

(56) References Cited

U.S. PATENT DOCUMENTS

| | | | |
|---|---|---|---|
| 5,495,532 A * | 2/1996 | Kilian et al. ............... | 380/30 |
| 5,568,554 A | 10/1996 | Eastlake, 3rd | |
| 6,772,343 B1 * | 8/2004 | Shimizu et al. ............. | 713/193 |
| 2004/0131181 A1 * | 7/2004 | Rhoads .......................... | 380/37 |
| 2007/0156586 A1 | 7/2007 | Kerschbaum | |
| 2007/0220094 A1 | 9/2007 | Kerschbaum et al. | |
| 2008/0010467 A1 | 1/2008 | Kerschbaum et al. | |

FOREIGN PATENT DOCUMENTS

| | | |
|---|---|---|
| EP | 1383265 A1 | 1/2004 |
| WO | WO-2005034423 A1 | 4/2005 |

OTHER PUBLICATIONS

"U.S. Appl. No. 11/483,246, Examiner Interview Summary mailed Jan. 4, 2010", 3 pgs.
"U.S. Appl. No. 11/483,246, Non Final Office Action mailed Oct. 15, 2009", 37 pgs.
"U.S. Appl. No. 11/483,246, Response filed Jan. 15, 2010 to Non Final Office Action mailed Oct. 15, 2009", 28 pgs.
"International Application Serial No. 07011111.7, Extended European Search Report mailed Dec. 20, 2007", 5 pgs.
"U.S. Appl. No. 11/483,246, Final Office Action mailed Apr. 12, 2010", 44 pgs.
"U.S. Appl. No. 11/483,246, Response filed Jul. 12, 2010 to", 25 pgs.

* cited by examiner

*Primary Examiner* — Taghi T Arani
*Assistant Examiner* — Mohammad L. Rahman
(74) *Attorney, Agent, or Firm* — Schwegman, Lundberg & Woessner, P.A.

(57) ABSTRACT

A system to contribute to creating a substring of a string may include a communication unit and a processing unit. The communication unit may be configured to receive an encrypted representation of a second share of the string. The string may be identical to the second share of the string combined with a first share of the string. The communication unit may be configured to send a rearranged representation of the encrypted representation of the second share of the string to a further system. The processing unit may be configured to rearrange a representation of the encrypted representation of the second share of the string using a first share of a start value of the substring. The start value may be identical to the first share of the start value added to a second share of the start value.

36 Claims, 11 Drawing Sheets

US 7,986,780 B2

PRIVACY-PRESERVING SUBSTRING CREATION

TECHNICAL FIELD

Embodiments relate to the field of electronic data processing and more particularly to secure computing.

BACKGROUND AND PRIOR ART

The field of electronic data processing has reached a high level of development. Many different kinds of data are processed and exchanged electronically. Data that is exchanged may be required to be protected against an access of unauthorized parties so that the data remain private. Secure computing may include processing and exchanging private data in such a way that privacy of the data is preserved.

Frequently, data that is processed may be represented as strings. The strings may include a sequence of elements, for example characters of the American Standard Code for Information Interchange (ASCII) code or Unicode. The strings may include elements that represent one or more text elements, for example, words or expressions that are meaningful in a language. Strings may be used in different areas for processing and exchanging data.

As an example, an enterprise may have a confidential document such as a purchase order. The enterprise may desire that one or more further entities process the purchase order in such a way that the one or more further entities may not be able to understand the contents of the purchase order. In an example, a data item of the purchase order, for example, a product code may be desired to be identified so that a certain level of privacy is preserved with respect to the purchase order and with respect to the product code. In an example, the purchase order may have a format of a string or may be transformable into the format of a string. The product code may be identifiable in the string representing the purchase order by having a position value at which a substring including the product code starts and having a length value of the substring.

DETAILED DESCRIPTION

Figure 1:
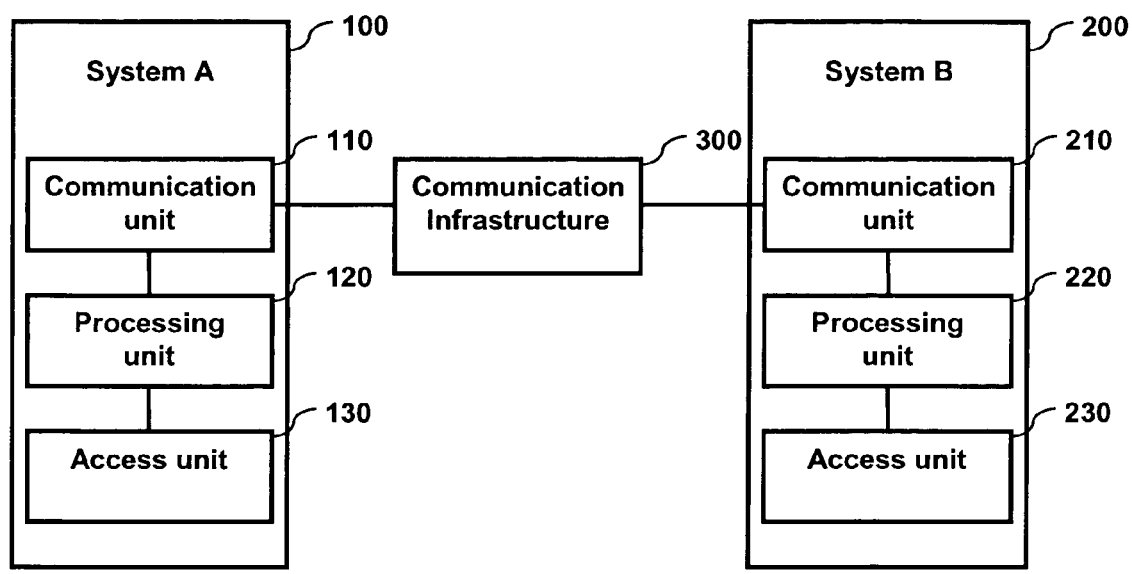
FIG. 1 is a block diagram of two example systems processing and exchanging data items.

Following embodiments address a string manipulation that preserves a privacy of one or more strings that are manipulated. The string manipulation may be performed by two parties and the privacy of the one or more strings is preserved with respect to the two parties. The string manipulation includes creating a substring of the string using a position value at which the substring starts in the string and using a length value of the substring in the string.

In an example embodiment, a system of a first party participates in the string manipulation and therefore contributes to the string manipulation. The system has components that are configured to process and exchange data items according to an implemented protocol. The system has a share of the string, a share of the position value of the substring, and a share of the length value of the substring. The shares allow for the system of the first party to participate in the implemented protocol and contribute to preserving the privacy of the string, the substring and position value and length value of the substring.

In further example embodiments, a further system of a second party participates in the string manipulation and therefore contributes to the string manipulation. The further system has components that are configured to process and exchange data items according to an implemented protocol. The further system has a further share of the string, a further share of the position value of the substring, and a further share of the length value of the substring. The shares allow for the further system to participate in the implemented protocol and contribute to preserving the privacy of the string, substring, and substring values.

A further example embodiment includes a method performed by the first party. The method includes operations that allow the first party to participate in an implemented protocol between the first party and the second party. The method operates with shares of the string, of the position value of the substring, and of the length value of the substring preserving the privacy of string, substring and substring values.

A further example embodiment includes a further method performed by the second party. The further method includes operations that allow the second party to participate in an implemented protocol between the first party and the second party. The method operates with shares of the string, of the substring, and of the position value and the length value of the substring preserving the privacy of the string, the substring and the values of the substring.

A further example embodiment includes a computer program product including instructions that may configure a computer system to execute operations in accordance with an implemented protocol.

A further example embodiment includes a further computer program product including instructions that may configure a computer system to execute further operations in accordance with an implemented protocol.

Systems that participate in one of the implemented protocols may provide a high level of security for preserving the privacy. One reason is that encryption of data has reached a high level of development and using the encryption of data provides a high level of security. Furthermore, each system preserves the privacy of the first string, the substring, and position value and length value so that successive string manipulations may be performed preserving the privacy of processed strings. As an example, this may prevent a system from being able to collect information about a string from successive string manipulations and derive statements about contents of the string. Furthermore, the systems may be able to participate in a protocol without relying on a further trusted system for performing further operations. Systems participating in an implemented protocol may be provided with appropriate shares of the string and the position value and the length value of the substring by a further system. By distributing the shares the further system may obtain a high level of security that the string and the substring remain private and are not revealed to the systems participating in the protocol.

The systems may be efficient compared to general circuit constructions because the systems perform calculations that are less costly than calculations of general circuit constructions. As an example, general circuit constructions may include calculating modular exponentiation which may not be required to be calculated by the systems. Furthermore, the systems may be efficient because a low number of data items may be exchanged.

Methods including operations contributing to an implemented protocol may provide a high level of security because using the encryption of data may be able to provide the high level of security. The methods preserve the privacy of the string and the substring so that successive string manipulations may be performed preserving the privacy of processed strings. Furthermore, the methods may be part of the protocol without relying on a further trusted system for performing further operations.

The methods may be efficient compared to general circuit constructions because calculations of the methods may be less costly than calculations of general circuit constructions and a low number of data items may be exchanged.

Computer program products that configure a computer system to execute operations according to embodiments of a method may also provide the high level of security and efficiency of the embodiments of the method.

The following description of examples includes details for illustrating embodiments and is not intended to limit the scope of the embodiments or to be exhaustive. For purposes of explanation, specific details are set forth in order to provide a thorough understanding of example embodiments. A person skilled in the art may appreciate that further embodiments may be practiced with details that differ from the specific details.

FIG. 1 is a block diagram of two example systems processing and exchanging data items. System A 100 and System B 200 are embodiments configured to contribute to creating a substring of a string. System A 100 may be a computer system and may include a communication unit 110, a processing unit 120, and an access unit 130. System B 200 may be a computer system and include a communication unit 210, a processing unit 220, and an access unit 230. Lines between blocks of the figure represent communicative couplings to exchange data between the blocks. In a further example, embodiments may include one or more systems without access units. The system A 100 is connected to the system B 200 through a communication infrastructure 300.

The system A 100 may be a personal computer (PC), a server, or a plurality of servers configured to execute software programs. The system 100 may include a client and a server related according to client server architecture, or may include one or more peer computers arranged in a peer-to-peer (or distributed) architecture. In a further example, the computer system may include a plurality of individual computer systems that are connected by the Internet or by an intranet of for example a company.

The system A 100 may run (for example host and execute) a program that configures the system A 100 to participate in a protocol for creating the substring of the string.

The communication unit 110 of the system A 100 may include a piece of hardware to receive and send signals that represent electronic data. Such a piece of hardware may be for example a modem, an Ethernet plug, or a device for wireless transmission of data. The communication unit 110 may also include a server to exchange data with the communication infrastructure 300. The communication unit 110 may further include a piece of software, for example, a program to control a communication with the processing unit 120 and the communication infrastructure 300.

The communication unit 110 may be configured to receive an encrypted representation of a second share of the string. The string may include the second share of the string combined with a first share of the string. In an example, the string may be identical to the second share of the string combined with a first share of the string. Combining the second share of the string with the first share of the string may include using a combining operation. The combining operation may include using the second share of the string and the first share of the string as inputs of a function to generate the string or a string that includes the string. Such a combining operation may be used for further examples described herein when two strings are combined to generate a resulting string. The communication unit 110 may be configured to send a rearranged representation of the encrypted representation of the second share of the string to the system B 200.

With this, the communication unit 110 may contribute to the creating of a second share of the substring. A first share of the substring and the second share of the substring may be combined to give the substring. In order to contribute to creating the first share of the substring the communication unit 110 may have certain features. In a further example, the communication unit 110 may be without the certain features and a further system may contribute to computing the first share of the substring.

The communication unit 110 may be configured to send an encrypted representation of the first share of the string to the system B 200 and receive a rearranged representation of the encrypted representation of the first share of the string. In a further example, a further system may be configured to send the encrypted representation of the first share of the string and receive the rearranged representation of the encrypted representation of the first share of the string.

The access unit 130 may include a random access memory (RAM), a database, or a file stored on a hard disc drive. The access unit 130 may include a further computer system that is used for storing data such as a data base server. The access unit 130 may be configured to access the first share of the string. The access unit 130 may access the first share of the string upon a request of the processing unit 120. The access unit 130 may accordingly provide the requested first share to the processing unit 120.

The processing unit 120 may be for example a central processing unit (CPU) of the system A 100 or an individual computer system that is a part of the computer system A 100. The processing unit 120 may also include software, for example, an operating system program.

The processing unit 120 may be configured to rearrange a representation of the encrypted representation of the second share of the string using a first share of the start value of the substring. In this way, the processing unit may be able to generate a rearranged representation of the encrypted representation of the second share of the string. Throughout the description, the processing unit may generate values by executing a specified manipulation of a specified start value. The start value may be a result of a function of the first share of the start value and the second share of the start value. In an example, the function may include adding the first share of the start value and the second share of the start value. In an example, the function may further include computing a modulus value of the sum of the first share and the second share with respect to a specific limit value. In a further example, the function may include different manipulations such as subtracting the first share of the start value from the second share of the start value.

The processing unit 120 may contribute to the creating the second share of the substring. In order to contribute to creating the first share of the substring the processing unit 120 may have certain features. In a further example, the processing unit 120 may be without the certain features and a further system may contribute to creating the first share of the substring.

The processing unit 120 may further be configured to encrypt the representation of the first share of the string and compute a decrypted string by decrypting the rearranged representation of the encrypted representation of the first share of the string.

The processing unit 120 may also be configured to rearrange the decrypted string using the first share of the start value of the substring and create a first share of the substring. Elements of the first share of the substring may be identified with a number of leading elements of the rearranged decrypted string. The number of leading elements may be identical to a first share of a length value of the substring. The length value may be a result of a function of the first share of the length value and the second share of the length value. In an example, the function may include adding the first share of the length value and the second share of the length value. In an example, the function may further include computing a modulus value of the sum of the first share and the second share with respect to a specific limit value. In a further example, the function may include different manipulations such as subtracting the first share of the length value from the second share of the length value. In an example, the length value of the substring may be identical to the first share of the length value added to a second share of the length value. The second share of the substring may be obtained by the second system B 200. In a further example, a further system may be configured to encrypt the representation of the first share of the string, compute the decrypted string, rearrange the decrypted string, and create the first share of the substring.

Strings and substring processed by the system A 100 may be represented for example by sequences of elements. In such a case, described string operations may be applied to sequences of elements that represent the corresponding string.

The communication infrastructure 300 may be for example the Internet that has no access control or an intranet with limited access by one or more entities. In a further example, the communication infrastructure 300 may also be a direct connection between the system A 100 and the system B 200.

The system B 200 may be a PC a server, or a number of servers configured to execute software programs. An embodiment of the system B 200 may have a structure that is identical to or different from a structure of an embodiment of the system A 100. This is also true for the components of the system B 200 that may be identical in structure to or different from the corresponding components of the system A.

The communication unit 210 may be configured to send an encrypted representation of the second share of the string to the system A 100. The communication unit 210 may be configured to receive a rearranged representation of the encrypted representation of the second share of the string.

The communication unit 210 may contribute to creating the second share of the substring. In order to contribute to computing the first share of the substring the communication unit 210 may have certain features. In a further example, the communication unit 210 may be without the certain features and a further system may contribute to computing the first share of the substring.

The communication unit 210 may be configured to receive an encrypted representation of the first share of the string. The encrypted representation may have been sent from the system A 100. The communication unit 210 may also be configured to send a rearranged representation of the encrypted representation of the first share of the string. In a further example, a further system may be configured to receive the encrypted representation of the first share of the string and send the rearranged representation of the encrypted representation of the first share of the string.

The access unit 230 may be configured to access a second share of the second string, in response to a respective request of the processing unit 220.

The processing unit 220 may be configured to encrypt the representation of the second share of the string and compute a decrypted string. Computing the decrypted string may include decrypting the rearranged representation of the encrypted representation of the second share of the string. The processing unit 220 may be configured to rearrange the decrypted string using the second share of the start value of the substring and create the second share of the substring. Creating the second share of the substring may include identifying elements of the second share of the substring with a number of leading elements of the rearranged decrypted string. The number of leading elements may be identical to a second share of the length value of the substring. The length value of the substring may include or be identical to the first share of the length value added to the second share of the length value.

The processing unit 220 may contribute to the creating the second share of the substring. In order to contribute to creating the first share of the substring the processing unit 220 may have certain features. In a further example, the processing unit 220 may be without the certain features and a further system may contribute to creating the first share of the substring.

The processing unit 220 may be configured to rearrange a representation of the encrypted representation of the first share of the string using the second share of the start value of the substring. In a further example, a further system may be configured to rearrange the representation of the encrypted representation of the first share of the string.

Strings and substring processed by the system B 200 may be represented for example by sequences of elements. In such a case, described string operations may be applied to sequences of elements that represent the corresponding string.

Figure 2:
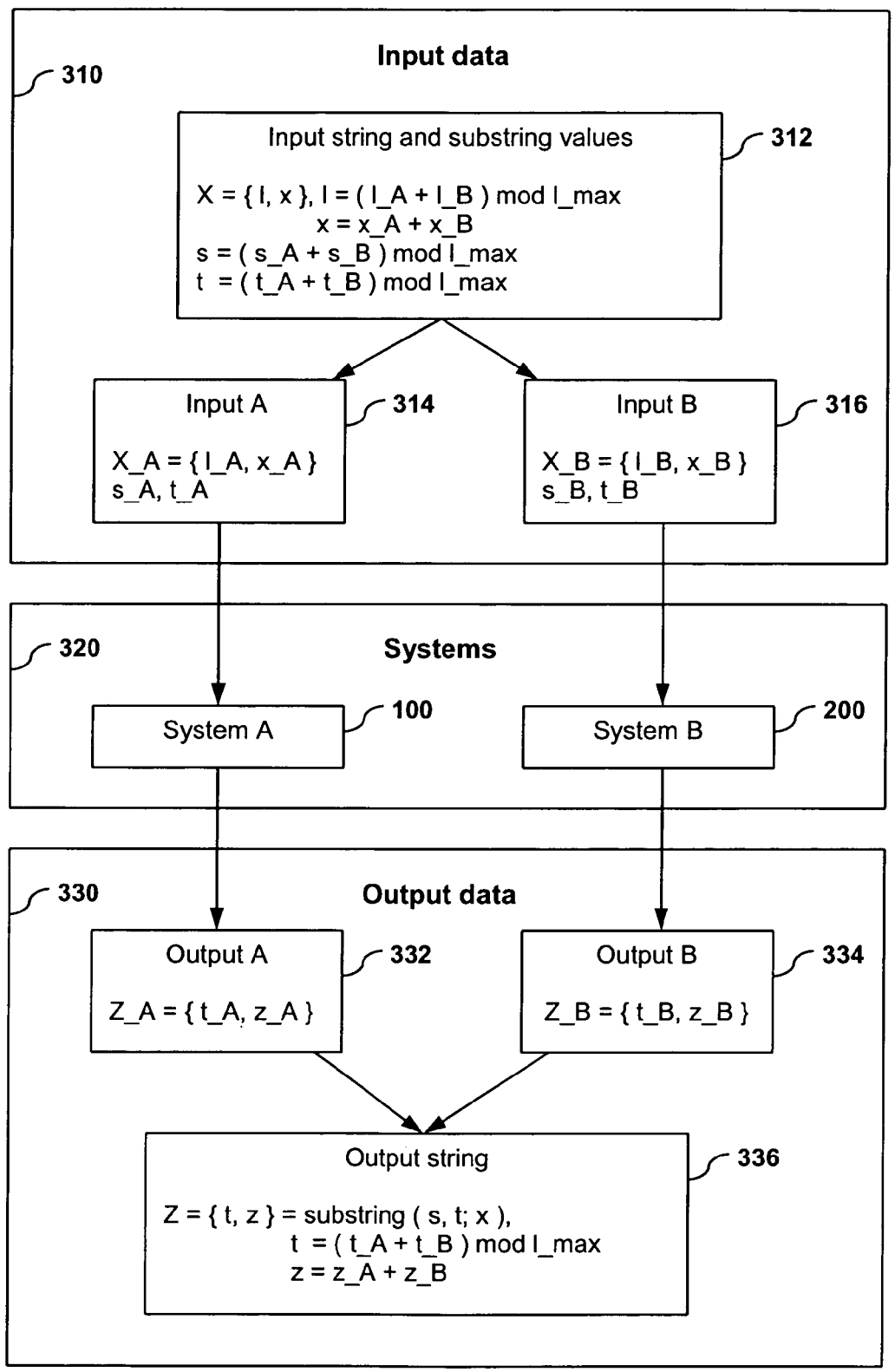
FIG. 2 is a block diagram of input data and output data of two example systems.

FIG. 2 is a block diagram of input data 310 and output data 330 of two example systems 320. The input data 310 include initial input string and substring values 312, input A 314, and input B 316. The output data 330 include output A 332, output B 334, and final output string 336. Arrows between blocks represent a functional relation between data items of a block.

In an example, a string is represented by specifying a length of the string and a sequence of elements. When the sequence has more elements than the length of the string the elements of the sequence that are not a part of the string may be identical to a padding value. The padding value may for example be selected to be represented in a binary representation by a sequence of zeros. In an example, representations of the strings have a length identical to (1_max−1) bytes, one byte representing one element of the sequence of the string. The length value 1_max may be identical to a power of two. In a further example, a string may be represented for example by a zero-terminated string representation.

The input data 320 includes the initial input string which is represented by X={1, x} having string length value 1 and element sequence x. The string can be obtained by combining the first share of the string represented by X_A={1_A, x_A} and the second share of the string represented by X_B={1_B, x_B}. The string length value 1 can be obtained from the first share of the length value 1_A and from the second share of the length value 1_B by calculating 1=(1_A+1_B) mod 1_max. The mod 1_max represents the modulus function with respect to 1_max. The sequence x can be obtained from the sequence of the first share x_A and from the sequence of the second share x_B by combining the sequences x=x_A+x_B.

In an example, a string may be combined with a further string by transforming a sequence of elements of the string into a bit sequence. This may be done by representing each element of the sequence by a number of bits that are part of the bit sequence. Accordingly, a sequence of elements of the further string may be transformed into a further bit sequence. In an example, the bit sequence and the further bit sequence are combined by using an exclusive OR (XOR) operation to combine each bit of the bit sequence with a corresponding bit of the further bit sequence. The resulting bit is a corresponding bit of a bit sequence representing a combined sequence of the combined string. In a further example, a sequence may be transformed into a different representation of the sequence. Furthermore, the operation on bits may be different from an exclusive OR operation, for example, the exclusive OR operation combined with a not operation.

The initial input string and substring values 312 further include the substring values with the start value s of the substring and the length value t of the substring. The start value s can be computed by calculating s=(s_A+s_B) mod 1_max and the length value t can be computed by calculating t=(t_A+t_B) mod 1_max. The substring values s and t define the substring as a part of the string by specifying that a start element of the substring is identical with an element at position s of the string. Furthermore, the following elements of the substring are identical with the t consecutive elements of the string that follow the element at position s. Therefore, the substring values s and t provide the information to extract a piece of the string that is identical to the substring.

The input A 314 includes the first share of the string represented by X_A, the first share of the start value represented by s_A, and the first share of the length value t_A. The input A 314 may be transmitted as input to system A 100 that is a part of system embodiments 320.

The input B 316 includes the second share of the string represented by X_B, the second share of the start value represented by s_B, and the second share of the length value t_B. The input B 316 may be transmitted as input to system B 200 that is a part of system embodiments 320.

In an example, the inputs to the system embodiments are transmitted using the same communication infrastructure that the system A 100 and the system B 200 use for exchanging data according to the protocol. In order to simplify the diagram, the data exchanged between the system A 100 and the system B 200 are not displayed in the figure.

The output data 330 includes the output A 332 with the first share of the substring represented by Z_A={t_A, z_A} being identical to the first share of the length value t_A and sequence z_A. The output data 330 further includes the output B 334 with the second share of the substring represented by Z_B={t_B, z_B} being identical to the second share of the length value t_B and sequence z_B.

The first share of the substring represented by Z_A and the second share of the substring represented by Z_B can be combined to give the final output string 336 represented by Z={t, z}. In an example, Z is identical to the substring of the string specified by the substring values s and t, the substring is represented by substring (s, t; x). Z can be obtained by calculating t=(t_A+t_B) mod 1_max and computing combination z=z_A+z_B.

In a further example, output A 332 may not be combined with output B 334 to give final output string 336. Instead output A 332 and output B 334 may be processed further separately, for example, for performing a further string manipulation. Similarly, input A 314 and input B 316 may be a result of a previous string manipulation and may not be computed from the initial input strings 312.

Figure 3:
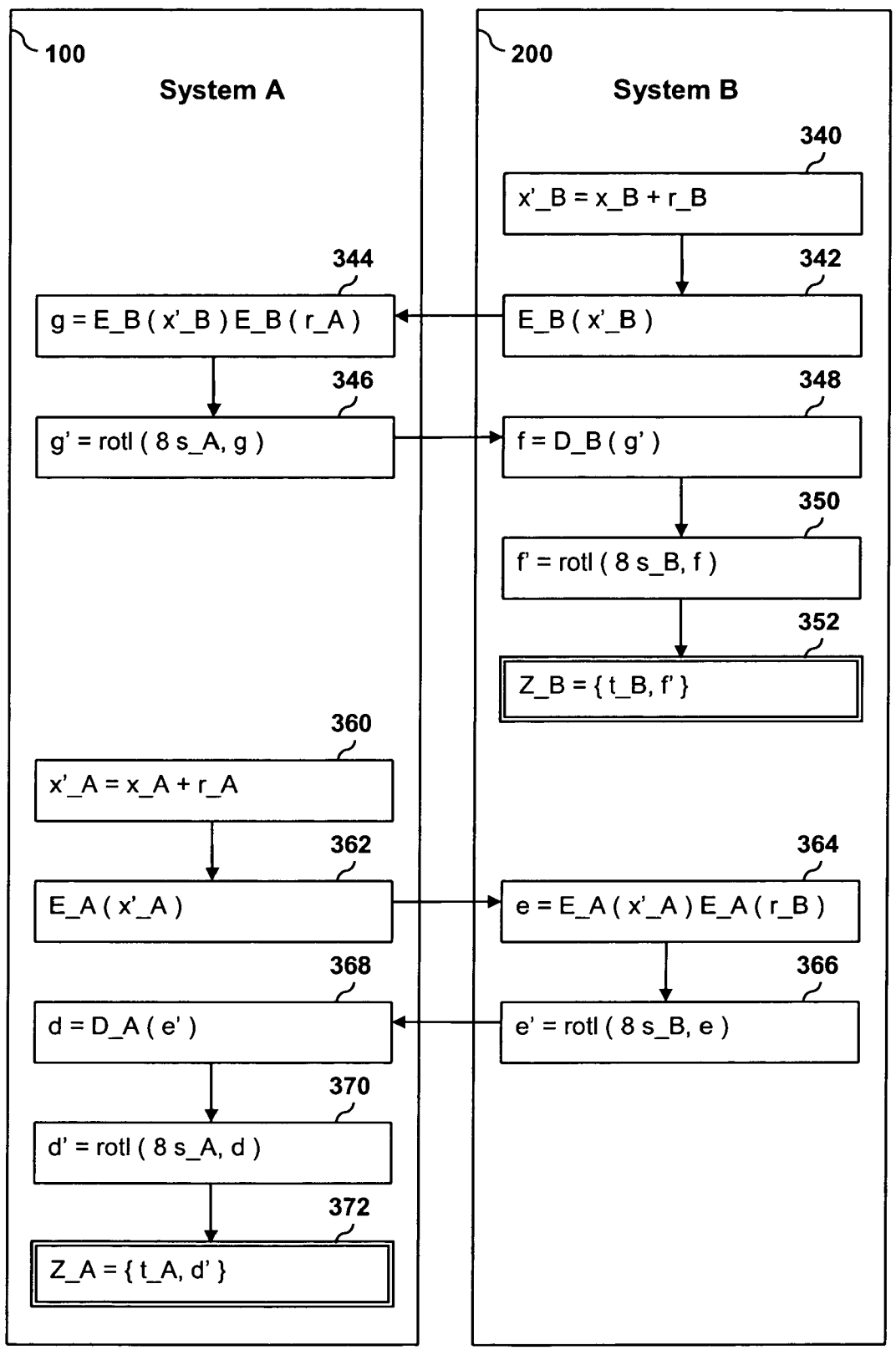
FIG. 3 is a block diagram of example embodiments of systems and data items processed and exchanged by the systems.

FIG. 3 is a block diagram of example embodiments of systems and data items processed and exchanged by the systems. The data items may be classified into data items related to computing the second share of the substring represented by Z_B 352 and data items related to computing the first share of the substring represented by Z_A 372. The data items Z_B 352 and Z_A 372 may be final results and are displayed with double lines. In a further example, the first share of the substring represented by Z_A 372 may be computed using further systems that may be different from system A 100 and system B 200.

Computing the second share of the substring represented by Z_B 352 may start with data item 340 being processed by the system B 200. The data item 340 includes a sequence x'_B of a representation of the second share of the string. The sequence x'_B of the representation of the second share is computed by combining the sequence x_B of the second share of the string with a sequence of a string of random elements r_B. The random elements may be determined using a standard random number generator to determine random, pseudo-random or substantially random values. In a further example, the representation of the second share may be identical to the second share of the string because no string with random elements is combined with the second share of the string. The data item 340 may be used to compute data item 342.

Data item 342 represents a sequence of the encrypted representation E_B (x'_B) of the second share, the second share having the sequence x_B. In the example, the representation of the second share of the string is encrypted with a public key encryption scheme E_B that is homomorphic with respect to the combining operation. Encrypting a string may include encrypting each bit of a bit sequence representing a sequence of the string. In a further example, encrypting a string may include encrypting a portion of the bits of a bit sequence of the string. The portion may for example include every second bit of the bit sequence. In a further example, the portion may include one or more sub-sequences of bits or bytes of the bit sequence that may be related to a homomorphic encryption scheme. In a still further example, an encrypted string may be identical to the string for example in the event of that the string is a result of an original string combined with a string of random elements. In an example shown in FIG. 3, the public key encryption scheme may use a pair of keys one of which is a public key for encrypting a value and one of which is a private key for decrypting a value. System B 200 may provide the public key used for encryption scheme E_B to system A 100 so that system A 100 may encrypt strings with E_B.

E_B is an example of a homomorphic encryption scheme E for which it is true E(S)E(T)=E(S+T), S and T being strings. Furthermore, it is true that E(S)□u=E(S□u), with S□u being an AND operation between bits of the bit sequence S and individual bit u and the bit operation E(S)□u being identical to E(u) if u=0 and identical to E(S) if u=1. Furthermore, the homomorphic encryption scheme E may be semantically secure so that a plain text may be encrypted to a plurality of cipher texts. Therefore, encryptions of the plain text may be untraceable because the plain text may not be guessed by encrypting test texts and compare encryption results with the cipher text of the plain text. This may provide a high level of security. Furthermore, a semantically secure homomorphic encryption E may be re-randomized to provide further security. A person skilled in the art will appreciate that a string encrypted with E may be manipulated without being able to gain knowledge about the string. An example for a semantically secure homomorphic encryption scheme may be the Goldwasser-Micali encryption.

The system B 200 may send the data item 342 to the system A 100 and accordingly system A 100 receives the encrypted representation E_B(x'_B) of the second share of the string. System A 100 processes E_B(x'_B) to compute data item 344.

Data item 344 represents the representation g of the encrypted representation of the second share of the string. The representation g of the encrypted representation may be computed by encrypting the string of random elements with the homomorphic public key encryption scheme to give E_B (r_A). For this, system A 100 may use the public key provided by system B 200 for encrypting a string with encryption scheme E_B. The sequence of the encrypted representation E_B(x'_B) of the second share of the string may then be multiplied with the sequence of the encrypted string E_B (r_A) of random elements to give g. In a further example, the encrypted representation of the second share of the string may be identical to the representation of the second share of the string. In a further example, g may be computed by combining the representation of the second share of the string with the string of random elements.

Data item 346 represents a sequence g' of the rearranged representation of the encrypted representation. In an example, g' is computed by transforming g into a bit sequence and rotating to the left each of the bit sequence by a number of positions equal to 8 s_A. The number of positions 8 s_A is identical to a number of bits of a bit sequence into which a string is transformed that has a length value identical to the second share of the start position s_A. In an example, an element of a sequence of a string is transformed into a sequence of eight bits therefore resulting in the number of 8 s_A. In a further example, using a further representation of an element of a sequence of a string the factor eight may be different. It follows that the system A 100 sends the data item 346 to the system B 200 that receives the rearranged representation g' of the encrypted representation of the second share of the string.

The system B 200 computes data item 348 representing a sequence f of the decrypted string by decrypting g' with a decryption scheme D_B of the encryption scheme E_B. The decryption scheme D_B is configured to decrypt a cipher text using a private key that is related to the public key of the encryption scheme E_B with which the cipher text has been computed. As a person skilled in the art will appreciate it may be due to the homomorphic feature of the encryption scheme that the sequence g' of the rearranged representation of the encrypted representation may be decrypted. In other words, the encrypted representation may be transformed into the representation of the encrypted representation and may still be decrypted and relatable to the representation x'_B 340. In a further example, the encrypted representation of the second share of the second string may be identical to the representation of the second share of the string. In a further example, the decrypted string f may be identical to g'.

Data item 350 represents the sequence f' of the rearranged decrypted string that is computed by transforming sequence f into a bit sequence and rotating to the left each bit of the bit sequence by a number of positions equal to 8 s_B. The number of positions is identical to a number of bits of a bit sequence into a string is transformed that has a length value of s_B. In an example, the number of positions is identical to 8 s_B because eight bits represent an element of a string sequence.

In a further example, bit sequences may generally be shifted to the left by the number of positions instead of rotated to the left by the number of positions. In a further example, this may result in a more complicated situation in the event of that l_max is reached by shifted bits.

Data item 352 includes the second share of the substring represented by Z_B. Z_B may be created by identifying the sequence z_B with the t_B leading elements of the sequence f' of the rearranged decrypted string.

Computing the first share of the substring represented by Z_A 372 may start with data item 360 being processed by system A 100. Processing operations of system A 100 for computing the first share of the substring may be related to processing operations of system B 200 for computing the second share of the substring. Furthermore, processing operations of system B 200 for computing the first share of the substring may be related to processing operations of system A 100 for computing the second share of the substring.

The data item 360 includes a sequence x'_A of a representation of the first share of the string. The sequence x'_A of the representation of the second share is computed by combining the sequence of the first share x_A of the string with a sequence of a string of random elements r_A. The random elements may be determined using a standard random number generator to determine random, pseudo-random or substantially random values. In a further example, the representation of the second share may be identical to the second share of the string because no string with random elements is combined with the second share of the string. The data item 360 may be used to compute data item 362.

Data item 362 represents a sequence of the encrypted representation E_A (x'_A) of the first share. The representation of the first share of the string is encrypted with the public key encryption scheme E_A that is homomorphic with respect to the combining operation. In an example of the figure, the public key encryption scheme may use a pair of keys one of which is a public key for encrypting a value and one of which is a private key for decrypting a value. Encryption scheme E_A may use an encryption function that is identical to the encryption function of E_B. However, E_A may use a set of public key and private key that is different from the set that E_B uses. System A 100 may provide the public key used for encryption scheme E_A to system B 200 so that system B 200 may encrypt strings with E_A. E_A is an example of a homomorphic encryption scheme E that may be semantically secure.

The system A 100 may send the data item 362 to the system B 200 and accordingly system B 200 receives the encrypted representation E_B(x'_A) of the first share of the string. System B 200 processes E_B(x'_A) to compute data item 364.

Data item 364 includes a sequence e of the representation of the encrypted representation of the first share of the string. The sequence e of the representation of the encrypted representation may be computed by encrypting the string of random elements with the homomorphic public key encryption scheme to give $E\_A(r\_B)$. For this, system B 200 may use the public key provided by system A 100 for encrypting a string with encryption scheme $E\_A$. The sequence of the encrypted representation $E\_B(x'\_A)$ of the first share of the string may then be multiplied with the sequence of the encrypted string $E\_B(r\_B)$ of random elements to give e. In a further example, the encrypted representation of the first share of the string may be identical to the representation of the first share of the string. In a further example, e may be computed by combining a sequence of the representation of the first share of the string with a sequence of the string of random elements.

Data item 366 represents a sequence e' of the rearranged representation of the encrypted representation. In an example, e' is computed by transforming e into a bit sequence and rotating to the right each bit of the bit sequence by a number of positions equal to $8\ s\_B$. The number of positions $8\ s\_B$ is identical to a number of bits of a bit sequence into which a string is transformed that has a length value $s\_B$. In an example, an element of a sequence of a string is transformed into a sequence of eight bits therefore resulting in the number of $8\ s\_B$. In a further example, using a further representation of an element of a sequence of a string the factor eight may be different. It follows that the system B 200 sends the data item 366 to the system A 100 that receives the sequence e' of the rearranged representation of the encrypted representation of the first share of the string.

The system A 100 computes data item 368 representing the sequence d of the decrypted string by decrypting e' with a decryption scheme $D\_A$ of the encryption scheme $E\_A$. The decryption scheme $D\_A$ is configured to decrypt a cipher text using a private key that is related to the public key of the encryption scheme $E\_A$ with which the cipher text has been computed. In a further example, the encrypted representation of the first share of the string may be identical to the representation of the first share of the string. In a further example, the sequence d of the decrypted string may be identical to e'.

Data item 370 represents the sequence d of the rearranged decrypted string that is computed by transforming d into a bit sequence and rotating to the left each bit of the bit sequence by a number of positions equal to $8\ s\_A$. The number of positions is identical to a number of bits of a bit sequence into which a string is transformed that has a length value $s\_A$. In an example, the number of positions is identical to $8\ s\_A$. In a further example, bit sequences may generally be shifted to the left by the number of positions instead of rotated to the left by the number of positions.

Data item 372 includes the first share of the substring represented by $Z\_A$. $Z\_A$ may be created by identifying the sequence $z\_A$ with the $t\_A$ leading elements of the sequence d' of the rearranged decrypted string.

Final results $Z\_A$ and $Z\_B$ may than be combined to give the substring. In a further example, final results $Z\_A$ and $Z\_B$ may be processed further individually in following string manipulations.

Figure 4A:
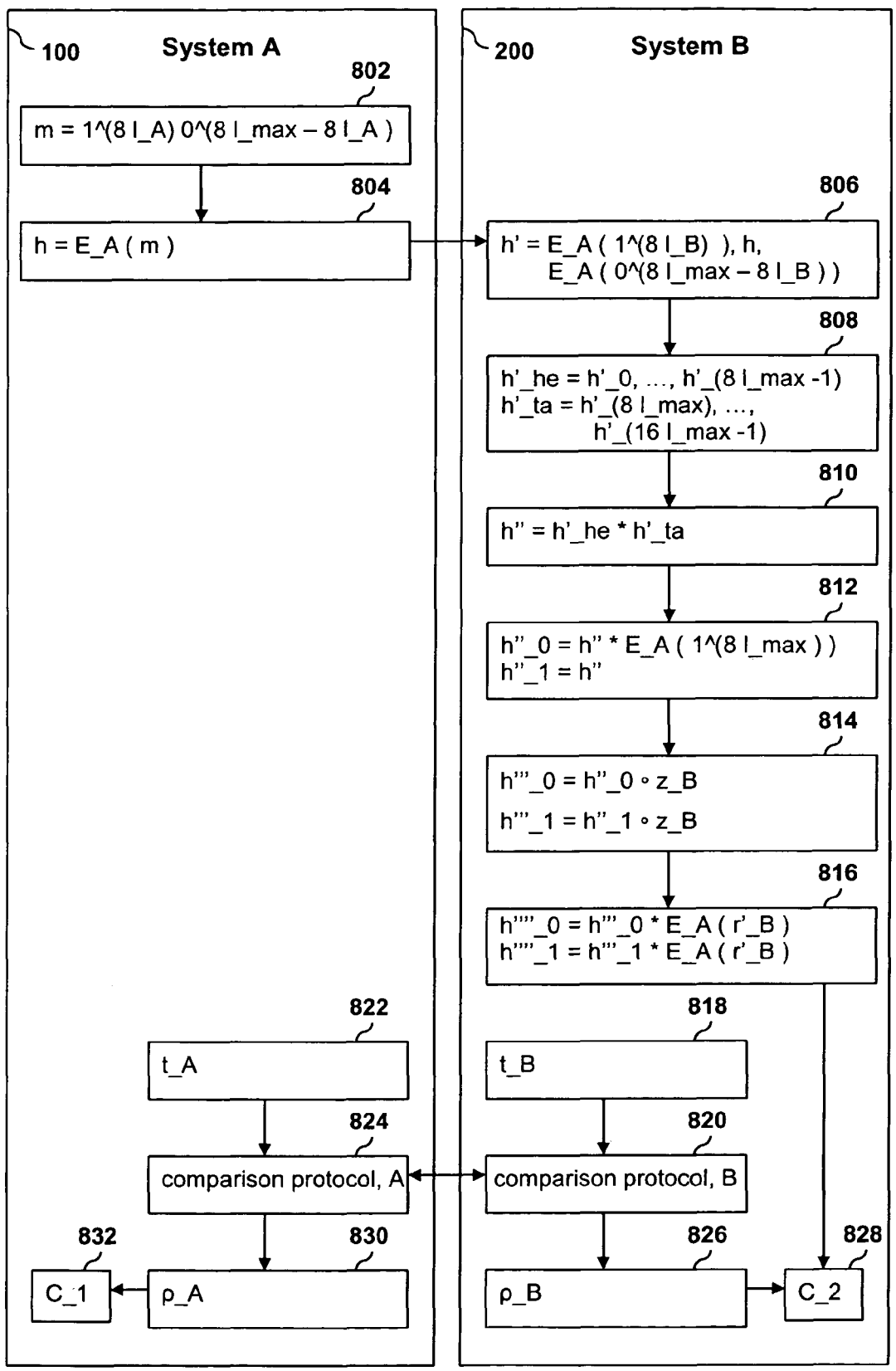
FIG. 4A is a block diagram displaying a first part of an example masking protocol executed by two example systems.

FIG. 4A is a block diagram displaying a first part of an example masking protocol executed by two example systems. The masking protocol may be executed by embodiments to create a further first share of the substring and a further second share of the substring.

The substring may include or be identical to the further first share of the substring combined with a further second share of the substring. The substring may be represented by leading elements of a further sequence that is identical to a further first sequence representing the further first share combined with a further second sequence representing the further second share. Furthermore, the further sequence may have further elements that follow the leading elements and that are identical to masking elements. In an example, the masking elements may be one masking element and in the example, the one masking element may be represented by a sequence of bits that are only zeros.

Representing the substring by the further sequence may be convenient when the further sequence, the further first sequence, or the further second sequence are used for further string manipulations. In such cases, the masking elements of the further sequence prevent a party from gaining a knowledge that goes beyond the leading elements of the further sequence.

In FIG. 4A, system A 100 may have the first share of the substring and the representation $Z\_A$ of the first share and system B 200 may have the second share of the substring and the representation $Z\_B$ of the second share.

System A 100 may start the optional masking protocol by creating a first masking sequence m 802. The first masking sequence m 802 may have a bit representation that consists of $8\ 1\_A$ ones and $(8\ 1\_max - 8\ 1\_A)$ zeros.

From the first masking sequence, system A 100 may compute h 804 by encrypting the first masking sequence using a homomorphic encryption scheme. The homomorphic encryption scheme and the public key may be identical to the homomorphic encryption scheme and the public key used for computing the sequence of the encrypted representation 362 (see FIG. 3) of first share of the string.

System A 100 may send data item h 804 to the system B 200 that computes a modified encrypted sequence h' 806. The modified encrypted sequence h' 806 includes an encryption of a bit sequence of $8\ 1\_B$ ones, h 804, and an encryption of a bit sequence of $(8\_1\ max - 8\ 1\_B)$ ones. In an example, the modified encrypted sequence h' 806 has 16 1_max bits.

From this, system B 100 computes partial data items 808 including h'_he that may be identical to encryption values of the leading 8 1_max head bits of h' and h'_ta that may be identical encryption values of the remaining 8 1_max tail bits of h'.

System B 200 may compute h" 810 from multiplying corresponding encryption values from the sequences h'_he and h'_ta. From this further encryption value sequences 812 may be computed one of which is h"_0 and one of which is h"_1 being identical to h".

System B 200 may compute split encryption value sequences 814 of the sequence of the second share of the substring. One of the split encryption values is h'"_0 obtained by the bit operation that is related to an AND operation of the homomorphic encryption scheme. As a person skilled in the art will appreciate, h"_0 may be represented as h"_0=h'_he*h'_ta and as h"_0=$E\_A$(m'_he+m'_ta)=$E\_A$(m'_he)*$E\_A$(m'_ta) with h'_he=$E\_A$(m'_he) and h'_ta=$E\_A$(m'_ta). Representing h"_0 as h"_0=$E\_A$(m"_0) the bit operation to obtain h'"_0 is given by h'"_0=h"_0∘z_B and can be represented as h'"_0=$E\_A$(m"_0□z_B). The bit operation may be applied to each bit of the bit sequence z_B to give an operation for processing z_B. In similar way h'"_1 can be computed by h'"_1=h"_1∘z_B.

Further, system B 200 may compute randomized split sequences 816 by h""_0=h'"_0*$E\_B$(r'_B) and h""_1=h'"_1*$E\_B$(r'_B). The sequence of random elements r'_B may be generated using a standard random value generator. The sequence of random elements r'_B may be encrypted by the homomorphic encryption scheme E_A and the public key that have been used to compute the modified encrypted sequence h' 806.

System B 200 has the second share of the length value of the substring t_B 818 that may be used as input of a part B 820 of a comparison protocol. The comparison protocol has also a part A 824 of the comparison protocol using as input the first share of the length value of the substring t_A 822. The comparison protocol compares t_A+t_B with 1_max. More precisely, the comparison protocol computes if t_A+t_B<1_max is true and encodes the result of a validity of the relation in the bit ρ=ρ_A+ρ_B, that is, by using an XOR operation for the bits ρ_A and ρ_B. Furthermore, the comparison protocol may preserve the privacy of the shares so that system A 100 may not get to know t_B and system B 200 may not get to know t_A. The comparison protocol may be according to a standard circuit solution of Yao's millionaires problem or to further available solutions of Yao's millionaires problem. In a further example, the comparison protocol may reveal the values t_A and t_B to system A 100 and to system B 200.

As a result of the comparison protocol system A 100 obtains the bit ρ_A 830 and system B 200 obtains the bit ρ_B 826. Data item C_2 828 of system B 200 may include the randomized split sequences 816 and the bit ρ_B 826. Data item C_1 832 of system A 100 may include the bit ρ_A 830.

Figure 4B:
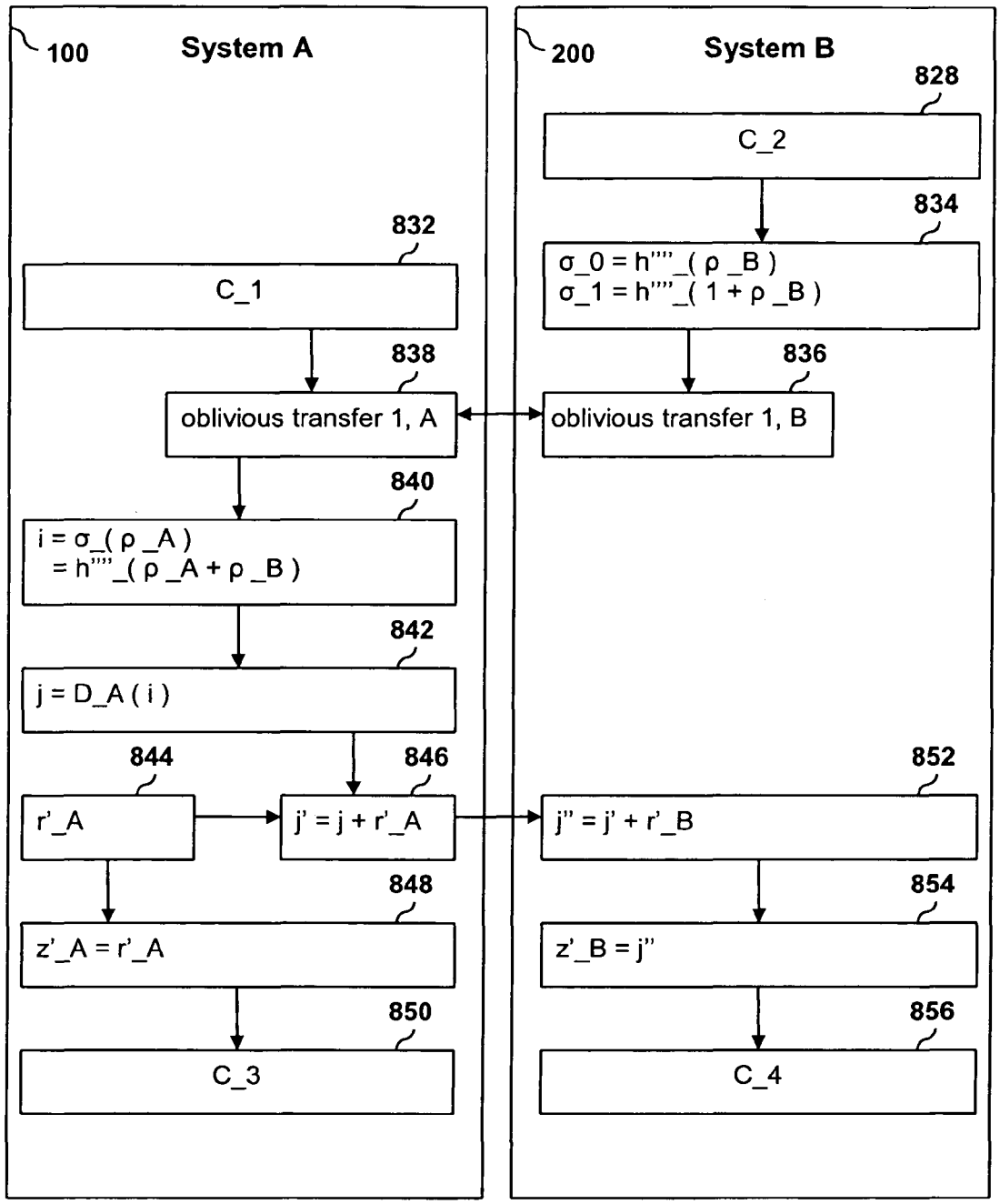
FIG. 4B is a block diagram displaying a second part of the example masking protocol executed by the two example systems.

FIG. 4B is a block diagram displaying a second part of the example masking protocol executed by the two example systems. The second part of the masking protocol may be executed directly following the first part of the masking protocol. For this, the second part may use data items C_1 832 of system A 100 and C_2 828 of system B 200.

System B 200 may use the randomized split sequences 816 and the bit ρ_B 826 to compute further split sequences 834 including σ_0=h""_(ρ_B) and σ_1=h""_(1+ρ_B).

The further split sequences 834 may be used for a part B 836 of a first oblivious transfer. The first oblivious transfer may have also a part A 838 that is executed by system A 100 and that has as input the bit ρ_A 830. The person skilled in the art will appreciate that standard solutions of the oblivious transfer are available. The first oblivious transfer may be used in a following way: system A 100 has bit ρ_A and system B 200 has two bit sequences σ_0 and σ_1; as a result of the first oblivious transfer system A 100 may obtain σ_(ρ_A) but may not get to know σ_(not ρ_A) and system B 200 may not get to know ρ_A. In a further example, the first oblivious transfer may also include system A 100 requesting directly σ_(ρ_A) from system B 200.

According to the first oblivious transfer, system A 100 may obtain i 840 and may decrypt i to obtain sequence j 842. The decryption scheme D_A may use the private key that is configured to decrypt values that have been encrypted with the public key of encryption scheme E_A used previously by system A 100 and system B 200.

System A 100 may generate a sequence r'_A 844 of random elements and combine the sequence r'_A 844 with the decrypted sequence j 842 using an XOR operation. The result may be a modified decrypted sequence j' 846 that may be sent to the system B 200. A sequence z'_A 848 of an intermediate first share of the substring may be identified with the sequence r'_A 848 and data item C_3 850 may include the sequence z'_A 848.

System B 200 may receive the modified decrypted sequence j' 846 and combine it with the previously generated sequence r'_B of random elements to obtain sequence j" 852. A sequence z'_B 854 representing an intermediate second share of the substring may be identified with the sequence j" 852 and data item C_4 856 may include the sequence z'_B 854.

Figure 4C:
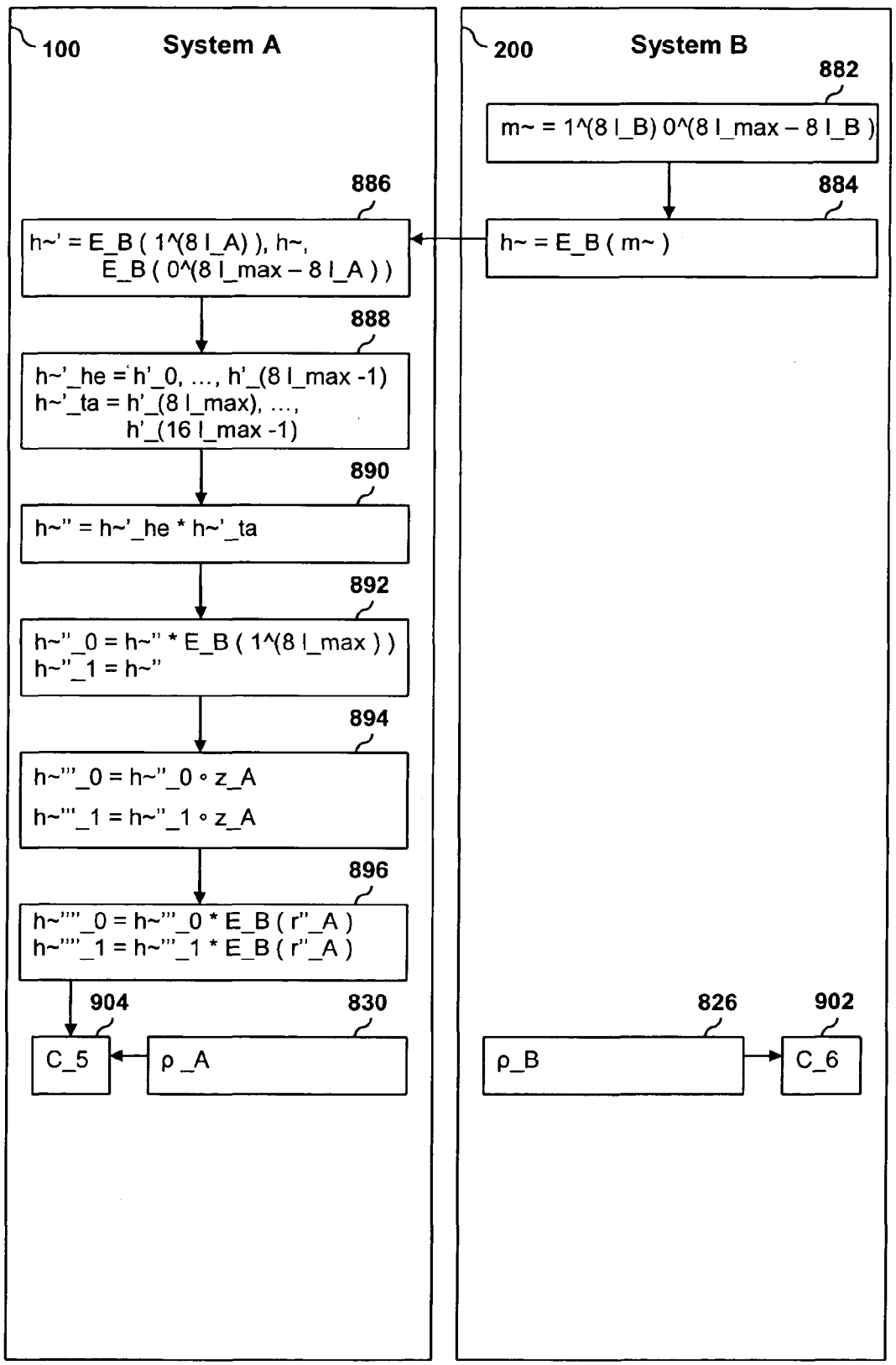
FIG. 4C is a block diagram displaying a third part of the example masking protocol executed by the two example systems.

FIG. 4C is a block diagram displaying a third part of the example masking protocol executed by the two example systems. Some of the operations of the third part of the masking protocol executed by system A 100 may correspond to operations of the first part of the masking protocol executed by system B 200. Similarly, some of the operations of the third part of the masking protocol executed by system B 200 may correspond to operations of the first part of the masking protocol executed by system A 100.

Accordingly, system B 200 may create a second masking sequence m~ 862. The second masking sequence m~ 882 may have a bit representation that consists of 8 1_B ones and (8 1_max−8 1_B) zeros.

From the first masking sequence, system B 200 may compute h~ 864 by encrypting the second masking sequence using a homomorphic encryption scheme. The homomorphic encryption scheme and the public key may be identical to the homomorphic encryption scheme and the public key used for computing the sequence of the encrypted representation 342 (see FIG. 3) of second share of the string.

System B 200 may send data item h~ 884 to system A 100 that computes a modified encrypted sequence h~' 886. The modified encrypted sequence h~' 886 includes an encryption of a bit sequence of 8 1_A ones, h~ 884, and an encryption of a bit sequence of (8_1 max−8 1_A) ones. In an example, the modified encrypted sequence h~' 866 has 16 1_max bits.

From this, system A 100 computes partial data items 888 including h~'_he that may be identical to encryption values of the leading 8 1_max head bits of h~' and h~'_ta that may be identical encryption values of the remaining 8 1_max tail bits of h~'.

System A 100 may compute h~" 890 from multiplying corresponding encryption values from the sequences h~'_he and h~'_ta. From this further encryption value sequences 892 may be computed one of which is h~"_0 and one of which is h~"_1 being identical to h~".

System A 100 may compute split encryption value sequences 894 of the sequence of the second share of the substring. One of the split encryption values is h~"_0 obtained by the bit operation that is related to an AND operation of the homomorphic encryption scheme. As a person skilled in the art will appreciate, h~"_0 may be represented as h~"_0=h~'_he*h~'_ta and as h~"_0=E_A(m~'_he+m~'_ta)=E_A(m~'_he)*E_A(m~'_ta) with h~'_he=E_A(m~'_he) and h~'_ta=E_A(m~'_ta). Representing h~"_0 as h~"_0=E_A(m~"_0) the bit operation to obtain h~'"_0 may be given by h~'"_0=h~"_0∘z_B and can be represented as h~'"_0=E_A(m~"_0□z_B). The bit operation may be applied to each bit of the bit sequence z_B to give an operation for processing z_B. In similar way h~'"_1 can be computed by h~'"_1=h~"_1∘z_B.

Further, system A 100 may compute randomized split sequences 896 by h~""_0=h~'"_0*E_B(r"_B) and h~""_1=h~'"_1*E_B(r"_B). The further sequence of random elements r"_B may be generated using a standard random value generator. The sequence of random elements r"_B may be encrypted by the homomorphic encryption scheme E_B and the public key that have been used to compute the modified encrypted sequence h~' 886.

Data item C_5 904 of system A 100 may include the randomized split sequences 896 and the bit ρ_A 830. Data item C_6 902 of system B 200 may include the bit ρ_B 826.

Figure 4D:
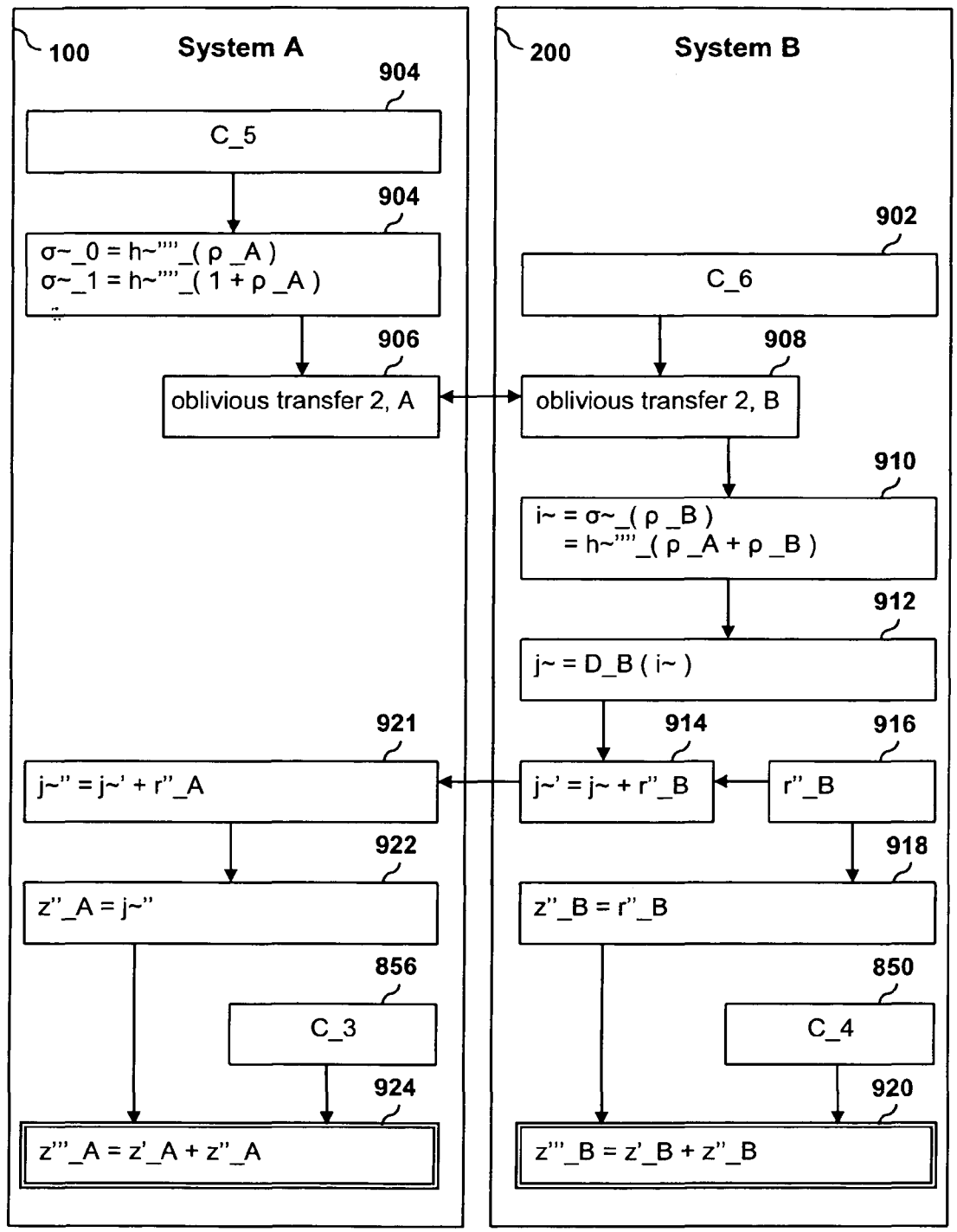
FIG. 4D is a block diagram displaying a fourth part of the example masking protocol executed by the two example systems.

FIG. 4D is a block diagram displaying a fourth part of the example masking protocol executed by the two example systems. The fourth part of the masking protocol may be executed directly following the third part of the masking protocol. For this, the fourth part may use data items C__5 904 of system A 100 and C__6 902 of system B 200.

System A 100 may use the randomized split sequences 896 and the bit ρ_A 830 to compute further split sequences 904 including σ~__0=h~''''__(ρ_A) and σ~__1=h~''''__(1+ρ_A).

The further split sequences 904 may be used for a part A 906 of a second oblivious transfer. The second oblivious transfer may have also a part B 908 that is executed by system B 200 and that has as input the bit ρ_B 826. The person skilled in the art will appreciate that standard solutions of the oblivious transfer are available. The second oblivious transfer may be used in a following way: system B 200 has bit ρ_B and system A 100 has two bit sequences σ__0 and σ__1; as a result of the second oblivious transfer system B 200 may obtain σ__(ρ_B) but may not get to know σ__(not ρ_B) and system A 100 may not get to know ρ_B. In a further example, the second oblivious transfer may also include system B 200 requesting directly σ__(ρ_B) from system A 100.

According to the second oblivious transfer, system B 200 may obtain i~ 910 and may decrypt i~ to obtain sequence j~ 912. The decryption scheme D_B may use the private key that is configured to decrypt values that have been encrypted with the public key of encryption scheme E_B used previously by system A 100 and system B 200.

System B 200 may generate a sequence r''_B 916 of random elements and combine the sequence r''_B 916 with the decrypted sequence j~ 912 using an XOR operation. The result may be a modified decrypted sequence j~' 914 that may be sent to the system A 100. A sequence z''_B 918 of a further intermediate second share of the substring may be identified with the sequence r''_B 916.

A sequence z'''_B 920 representing the further second share of the substring may be computed by combining the sequence z'_B 854 of the intermediate second share of the substring and the sequence z''_B 918 of the further intermediate second share of the substring. The sequence z'_B 854 may be a part of the data item C__4 850 computed in a previous part of the masking protocol.

System A 100 may receive the modified decrypted sequence j~' 914 and combine it with the previously generated sequence r''_A of random elements to obtain sequence j~'' 921. A sequence z''_A 922 of a further intermediate second share of the substring may be identified with the sequence j~'' 921.

A sequence z'''_A 924 representing the further first share of the substring may be computed by combining the sequence z'_A 848 of the intermediate first share of the substring and the sequence z''_A 922 of the further intermediate second share of the substring. The sequence z'_A 848 may be a part of the data item C__3 856 computed in a previous part of the masking protocol.

The sequence z'''_B 920 and the sequence z'''_A 924 may be final results of an example protocol to create the further first share of the substring and the further second share of the substring. Combining the sequence z'''_B 920 and the sequence z'''_A 924 gives the further sequence that represents the substring with the leading elements and that has following masking elements.

Figure 5A:
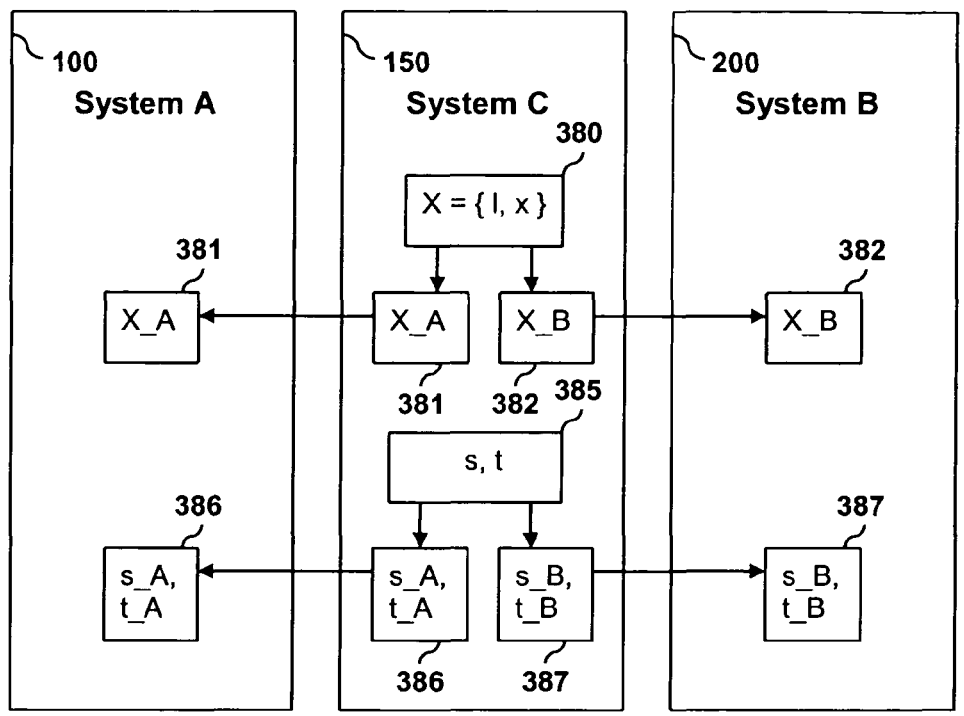
FIG. 5A is a block diagram of two example systems participating in a protocol and a third example system providing input data items.

FIG. 5A is a block diagram of two example systems participating in a protocol and a third example system providing input data items. The two example systems participating in the protocol for creating the substring are the system A 100 and the system B 200. The third system C 150 provides the input data items for the protocol.

In an example, system C 150 may have a representation X 380 of the string and substring values 385. The system C 150 may split the representation X 380 into the first share of the string represented by X_A 381 and into the second share of the string represented by X_B 382. The splitting may be done in such a way that combining the first share of the string represented by X_A 381 and the second share of the string represented by X_B 382 gives the string. The splitting may be done using a standard random number generator to determine how a bit of the sequence of the first string is split into two split bits. Furthermore, a standard random number generator may be used to determine which one of the split bits is distributed to the first share of the string and which one of the split bits is distributed to the second share of the string.

Accordingly, system C 150 may split the substring values 385 into data item 386 and into data item 387. Data item 386 includes the first share of the start value s and the first share of the length value t. Data item 387 includes the second share of the start value s and the second share of the length value t. The splitting may be done in such a way that adding the first share of the start value and the second share of the start value gives the length value. Furthermore, adding the first share of the length value and the second share of the length value may give the length value. The splitting may be done using a standard random number generator.

Following computing the splits, system C 150 may send the first share of the string represented by X_A 381 and the first share of the substring values 386 to the system A 100. Furthermore, system C 150 may send the second share of the string represented by X_B 382 and the second share of the substring values 387 to the system B 200. Following receiving the shares of the string and the substring values the system A 100 and the system B 200 may participate in the protocol to create the substring without gaining knowledge about the string or the substring values.

Figure 5B:
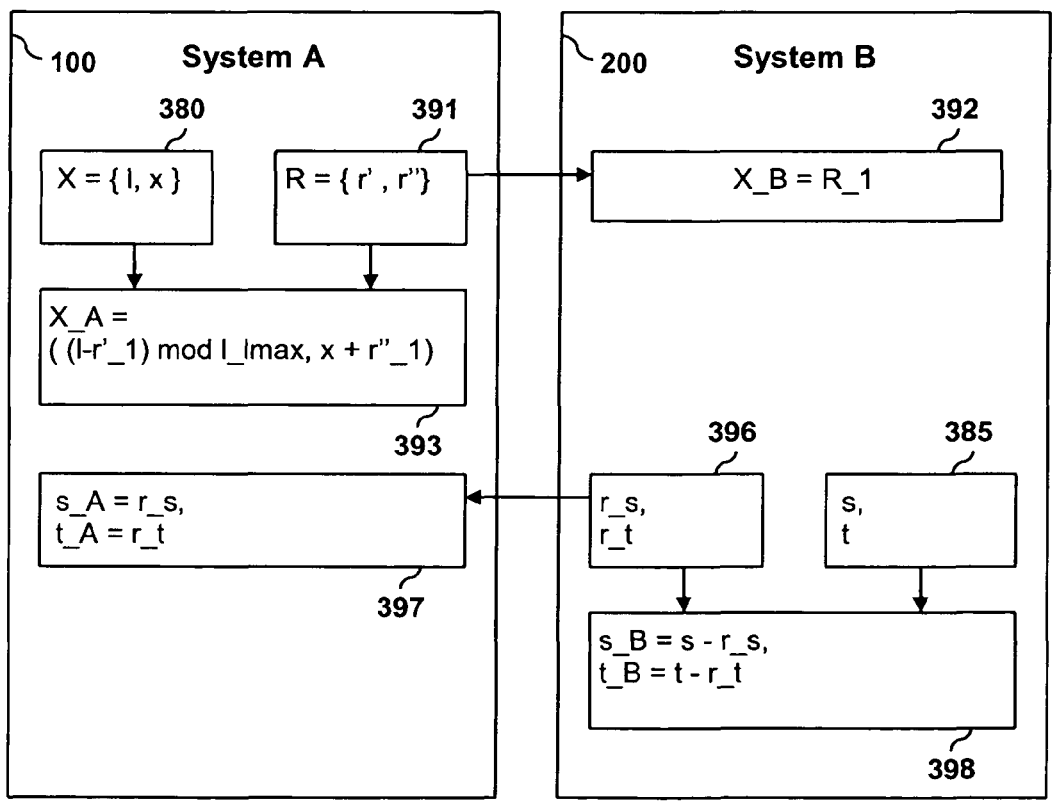
FIG. 5B is a block diagram of two example systems participating in a protocol and providing input data items.

FIG. 5B is a block diagram of two example systems participating in a protocol and providing input data items. The two example systems participating in the protocol are the system A 100 and the system B 200.

In an example, system A 100 has the string represented by X 380 and system B 200 has the substring values 385. System A 100 and system B 200 may for example desire to create the substring in such a way that the substring is not revealed to the system A 100 or the system B 200. In a further example, system A 100 may have the substring values and system B 200 may have the string. In such a case, system A 100 may execute operations identical to an example of the figure but for the substring values and system B 200 may execute operations identical to an example of the figure for the string.

In an example, system A 100 may create a string with random elements represented by R__1 391. R__1 391 has a length value of r'__1 and sequence of elements identical to r''__1. R__1 391 may have been created using a standard random number generator. System A 100 may send R__1 391 to system B 200 that may set the second share of the string represented by X_B 392 equal to R__1.

System A 100 may compute the first share of the string represented by X_A 393 from the string represented by X 380 and the string of random elements represented by R__1 391 to be X_A=((1−r'__1) mod 1__1 max, x+r''__1).

System B 200 may create two random values 396 r_s and r_t. Random values 396 may be created using a standard random number generator. System B 200 may send the random values 396 to system A 100 that derive from random values the first share of the substring values 397.

System B 200 may compute the second share of the substring values 398 from the random values 385 to be s_B=s−r_s and t_B=t−r_t.

Figure 6:
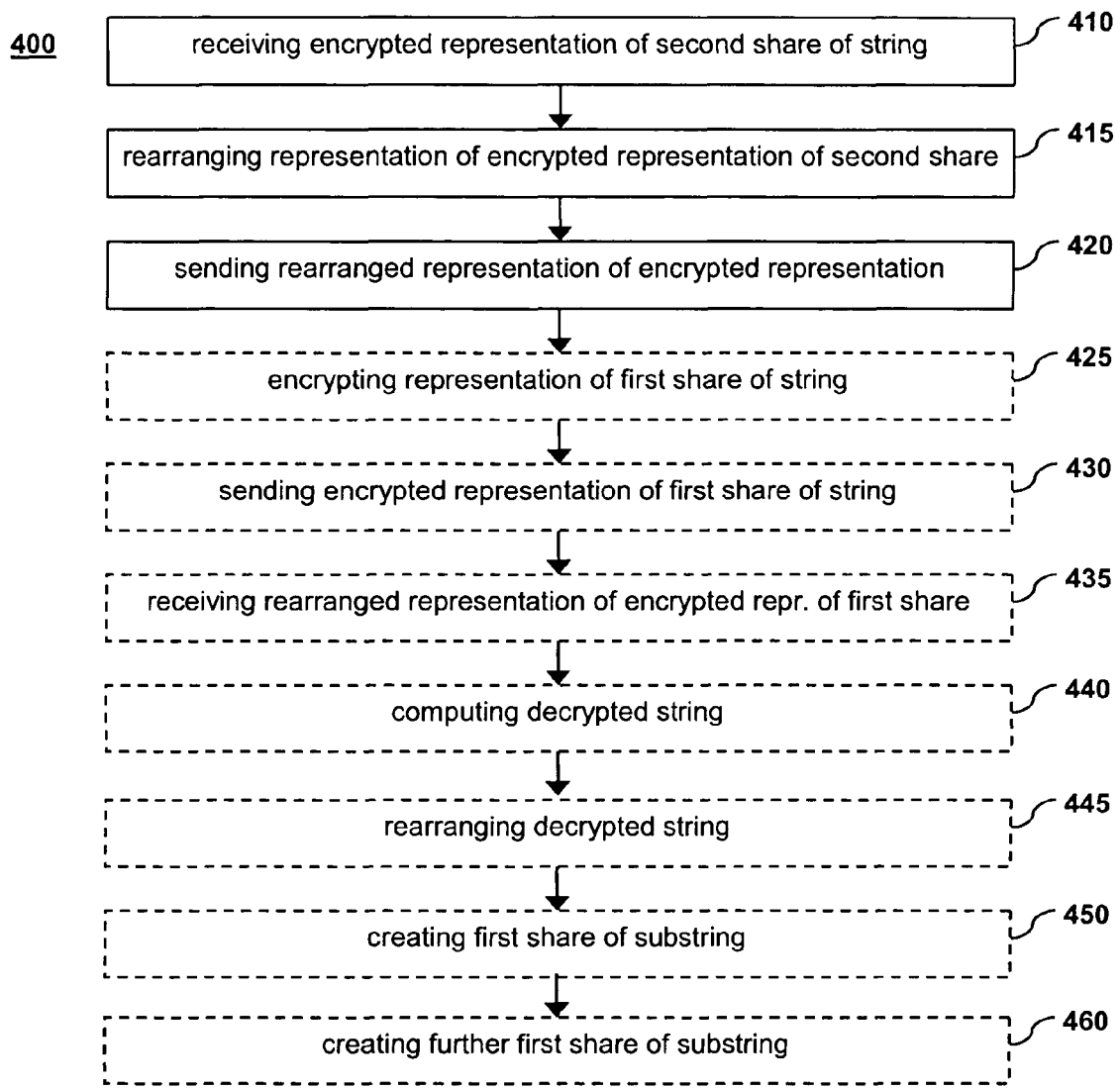
FIG. 6 is a flow diagram of a method, according to an example embodiment, participating in an example protocol.

FIG. 6 is a flow diagram of a method 400, according to an example embodiment participating in an example protocol. The method 400 is for contributing to creating the substring. The method 400 may be executed by a first party that uses for example a computer system and that may communicate with a second party. The method 400 includes optional operations that are represented by broken lines. Operations of the method may be executed in an order differing from the order given in an example. In a further example, optional method operations may be executed prior to further operations of the method. In a further example, one or more of the optional operations may not be performed. In a further example, further optional operations may be performed. Therefore, optional features of the embodiment may be combined in ways that differ from the optional features of an example embodiment.

Optional operations of example methods are designated as optional herein because the optional operations may be executed by a further party participating in a protocol. Therefore, operations of example methods that are not designated as optional may be or may not be required for executing the example methods. Furthermore, example methods may have features with example implementations that are identical or similar to example implementations of features of example systems described herein. Furthermore, an example implementation of a feature of an embodiment may be independent from a further example implementation of a further feature of the embodiment. Independent example implementations may be combined in an example embodiment and may not be combined in a further example embodiment.

The method 400 includes receiving 410 the encrypted representation of the second share of the string. From this, the representation of the encrypted representation may be computed by multiplying the encrypted representation with the encrypted string of random elements. The string or random elements may be encrypted using a homomorphic encryption scheme that may be semantically secure with a public key that may be provided from the second party.

Following operations may include rearranging 415 the representation of the encrypted representation of the second share of the string using the first share of the start value of the substring. Rearranging 415 the representation may include transforming the representation into bit sequences. Rearranging 415 may further include rotating to the left each of the bit sequences by a number of positions. The number of positions may be identical to a number of bits of a bit sequence into which a string is transformed having a length value identical to the first share of the start value.

The method 400 may include sending 420 the rearranged representation of the encrypted representation of the second share of the string to the second system of the second party.

A following optional operation may include encrypting 425 the representation of the first share of the string using a homomorphic encryption scheme that may be semantically secure with a public key that may be provided to the second party.

Optional operations of the method 400 may include sending 430 the encrypted representation of the first share of the string to the second party.

A following optional operation may include receiving 435 the rearranged representation of the encrypted representation of the first share of the string.

In an example it follows optional operation computing 440 the decrypted string by decrypting the encrypted representation of the rearranged first share of the string. For this the private key may be used that is related to the public key of the homomorphic encryption scheme with which the representation of the first share of the string has been encrypted.

It may further follow optional operation rearranging 445 the decrypted string using the first share of the start position of the substring. Rearranging 445 may include transforming the sequence of the decrypted string and rotating to the left by the same number of bits as in a previous rearranging operation 415.

It may follow optional operation computing 450 the first share of the substring.

Figure 7:
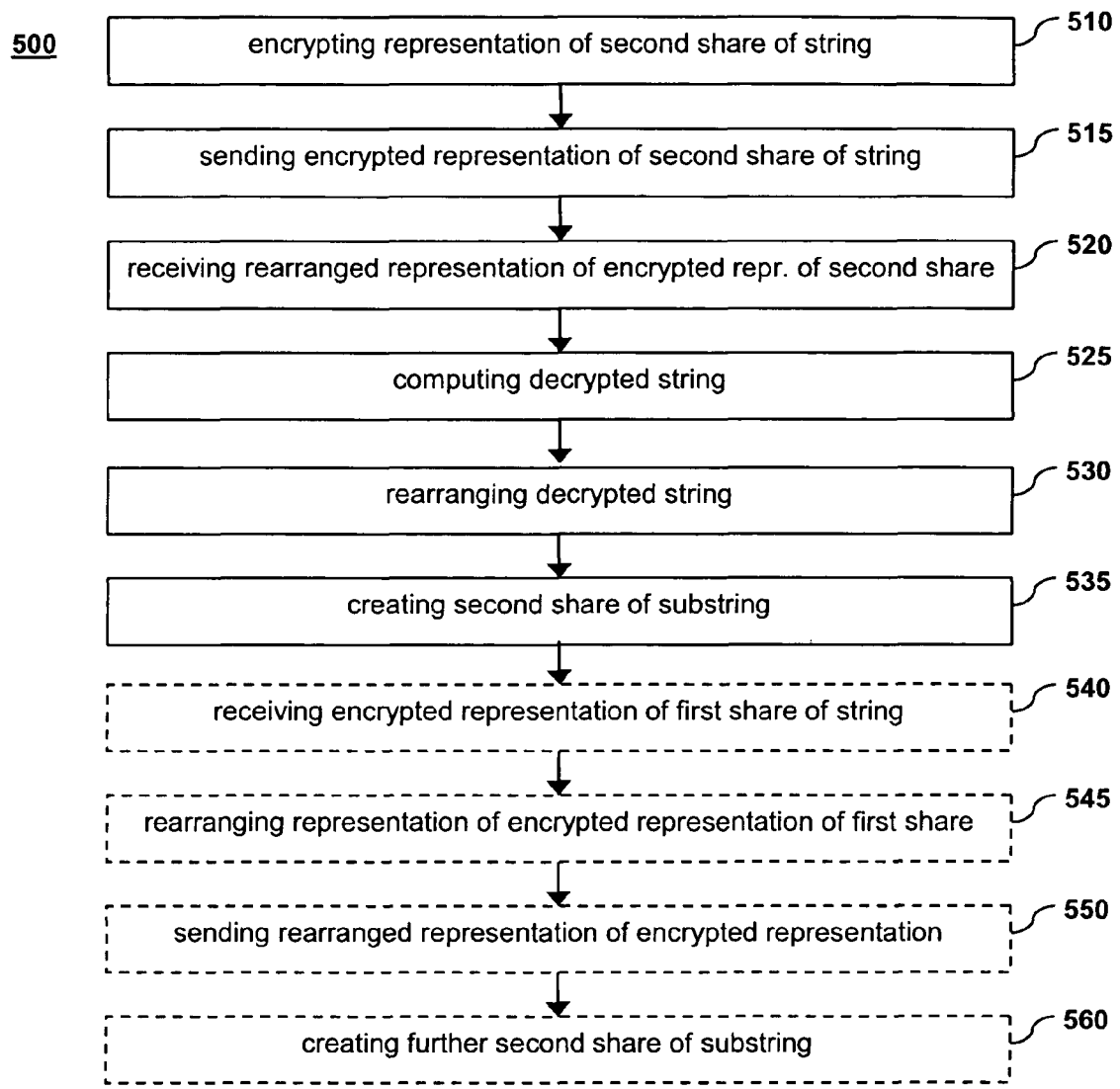
FIG. 7 is a flow diagram of a further method, according to an example embodiment participating in the example protocol.

FIG. 7 is a flow diagram of a further method 500 according to an example embodiment, participating in the example protocol. The method 500 is for contributing to the creation of the substring. The method 500 may be executed by the second party that uses for example a computer system and that may communicate with the first party. The method 500 includes optional operations that are represented by broken lines. In further examples, optional features of the embodiment may be combined in ways that differ from the optional features of an example embodiment. Operations of the method may be executed in an order differing from the order given in an example.

The method 500 includes encrypting 510 the representation of the second share of the string using a homomorphic encryption scheme that may be semantically secure with a public key that may be provided to the first party.

An operation of the method 500 may include sending 515 the encrypted representation of the second share of the string to the first party.

Following operations may include receiving 520 the rearranged representation of the encrypted representation of the second share of the string.

The decrypted string may be computed 525 by decrypting the rearranged representation of the encrypted representation of the first share of the string. For this, the private key may be used that is related to the public key of the homomorphic encryption scheme with which the representation of the second share of the string has been encrypted.

The decrypted string may be rearranged 530 using the first share of the start value of the substring. Rearranging 530 the representation may include transforming the representation into bit sequences. Rearranging 530 may further include rotating to the left each of the bit sequences by a number of positions that is related to the length value of the second share of the first string. The number of positions may be identical to a number of bits of a bit sequence into which a string is transformed having a length value identical to the second share of the start value.

The second share of the substring may be computed 435.

Optional operations may include receiving 540 the encrypted representation of the first share of the string. From this, the representation of the encrypted representation may be computed by multiplying the encrypted representation with the encrypted string of random elements. The string or random elements may be encrypted using a homomorphic encryption scheme that may be semantically secure with a public key that may be provided from the second party.

Following optional operations may include rearranging 545 the representation of the encrypted representation of the first share of the string using the second share of the start value of the substring. Rearranging 545 may include transforming the sequence of the decrypted string and rotating to the left by the same number of bits as in previous rearranging operation 530.

The method 500 may include sending 550 the rearranged representation of the encrypted representation of the second share of the string to the second system of the second party.

Figure 8:
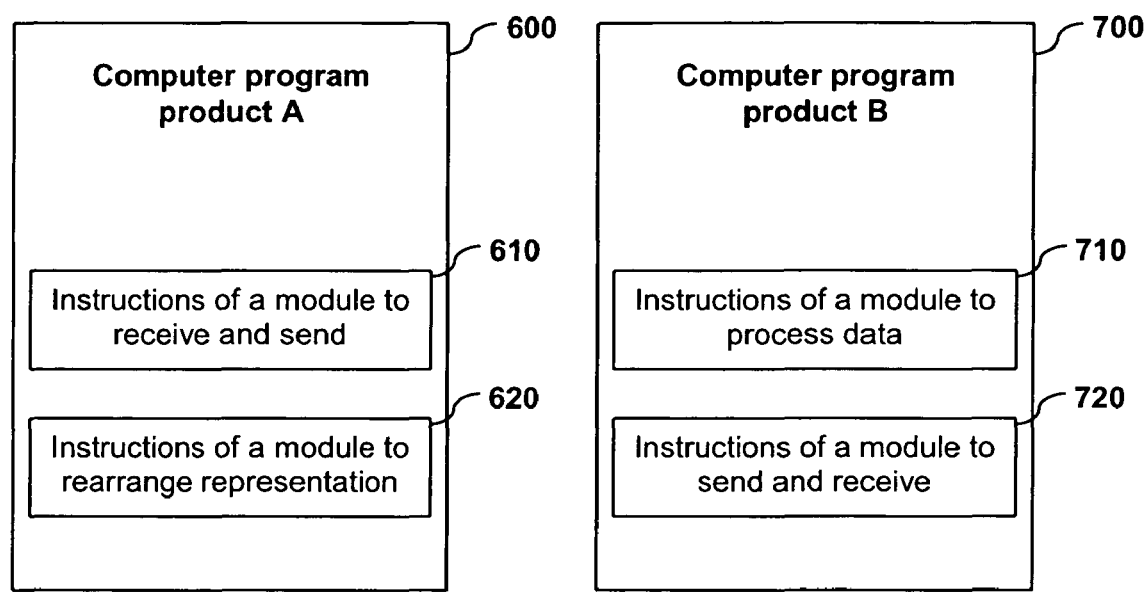
FIG. 8 is a block diagram of two example computer program products.

FIG. 8 is a block diagram of two example computer program products. The two computer program products include a computer program product A 600 and computer program product B 700. Computer program products A 600 and B 700 include instructions that may be readable by a computer and may cause the computer to execute operations specified by the computer program products. In an example, the instructions of the computer program products A 600 and B 700 may be directly understandable by the computer. In a further example, the instructions of the computer program products A 600 and B 700 may be indirectly understandable by the computer, for example, requiring a transformation of the instructions to a further set of instructions.

The computer program product A 600 for contributing to creating the substring may include instructions of a module 610 to receive the encrypted representation of the second share of the string and to send the rearranged representation of the encrypted representation of the second share of the string to a further party.

The computer program product A 600 may further include instructions of a module 620 to rearrange the representation of the encrypted representation of the second share of the string.

In a further example, the computer program product A 600 may have optional features that may be readable by the computer and that may cause the computer to execute one or more of the optional operations of method 400 (see FIG. 6).

The computer program product B 700 for contributing to creating a substring may include instructions of a module 710 to process data. Processing data may include: encrypting the representation of a second share of the string, computing the decrypted string by decrypting the rearranged representation of the encrypted representation of the second share of the string, rearranging the decrypted string using the second share of the start value of the substring, and computing the second share of the substring.

The computer program product B 700 may include instructions of a module 720 to send the encrypted representation of the second share of the string to the further party and to receive the rearranged representation of the encrypted representation of the second share of the string.

In a further example, the computer program product B 700 may have optional features that may be readable by the computer and that may cause the computer to execute one or more of the optional operations of method 500 (see FIG. 7).

As noted above, example embodiments within the scope of the present invention include computer program products. The computer program products may be stored on computer-readable media for carrying or having computer-executable instructions or data structures. Such computer-readable media may be any available media that can be accessed by a general purpose or special purpose computer. By way of example, such computer-readable media may include RAM, ROM, EPROM, EEPROM, CD-ROM or other optical disk storage, magnetic disk storage or other magnetic storage devices, or any other medium that may be used to carry or store desired program code in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is an example of a computer-readable medium. Combinations of the above are also to be included within the scope of computer-readable media. Computer-executable instructions include, for example, instructions and data which cause a general purpose computer, a special purpose computer, or a special purpose processing device to perform a certain function or group of functions. Furthermore, computer-executable instructions include, for example, instructions that have to be processed by a computer to transform the instructions into a format that is executable by a computer. The computer-executable instructions may be in a source format that is compiled or interpreted to obtain the instructions in the executable format. When the computer-executable instructions are transformed, a first computer may for example transform the computer-executable instructions into the executable format and a second computer may execute the transformed instructions. The computer-executable instructions may be organized in a modular way so that a part of the instructions may belong to one module and a further part of the instructions may belong to a further module. However, the differences between different modules may not be obvious and instructions of different modules may be intertwined.

Example embodiments have been described in the general context of method operations, which may be implemented in one embodiment by a computer program product including computer-executable instructions, such as program code, executed by computers in networked environments. Generally, program modules include for example routines, programs, objects, components, or data structures that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such operations.

Some embodiments may be operated in a networked environment using logical connections to one or more remote computers having processors. Logical connections may include for example a local area network (LAN) and a wide area network (WAN). The examples are presented here by way of example and not limitation. Such networking environments are commonplace in office-wide or enterprise-wide computer networks, intranets and the Internet. Those skilled in the art will appreciate that such network computing environments will typically encompass many types of computer system configurations, including personal computers, handheld devices, multi-processor systems, microprocessor-based or programmable consumer electronics, network PCs, mini-computers, mainframe computers, and the like. Embodiments may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing the overall system or portions might include a general purpose computing device in the form of a conventional computer, including a processing unit, a system memory, and a system bus that couples various system components including the system memory to the processing unit. The system memory may include read only memory (ROM) and random access memory (RAM). The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The drives and their associated computer-readable media provide nonvolatile storage of computer-executable instructions, data structures, program modules and other data for the computer.

Software and web implementations could be accomplished with standard programming techniques with rule based logic and other logic to accomplish the various database searching steps, correlation steps, comparison steps and decision steps. It should also be noted that the word "component" as used herein and in the claims is intended to encompass implementations using one or more lines of software code, hardware implementations, or equipment for receiving manual inputs.

What is claimed is:

1. A system to contribute to creating a substring of a string, the system comprising:
    a communication unit to receive an encrypted representation of a second share of the string, the second share of the string being combinable with a first share of the string via a combining operation to generate the string; and
    a processing unit to, using a processor,
        rearrange a representation of the encrypted representation of the second share of the string using a first share of a start value of the substring to generate a rearranged representation of the encrypted representation of the second share of the string, the start value being a result of a function of the first share of the start value and a second share of the start value, the string not being revealed to the system;
        compute a decrypted string by decrypting a received rearranged representation of the encrypted representation of the first share of the string;
        rearrange the decrypted string using the first share of the start value of the substring, and
        create a first share of the sub string by identifying elements of the first share of the substring with a number of leading elements of the rearranged decrypted string, the first share of the substring being combinable with a second share of the sub string via a combining operation to generate the sub string and the number of leading elements being identical to a first share of a length value of the substring, the length value of the substring being a result of a function of the first share of the length value and a second share of the length value;
    the communication unit further to send the rearranged representation of the encrypted representation of the second share of the string to a further system.

2. The system of claim 1 wherein the communication unit is to:
    send the encrypted representation of the first share of the string to the further system, and
    receive the received rearranged representation of the encrypted representation of the first share of the string; and wherein the processing unit is to encrypt the representation of the first share of the string.

3. The system of claim 1, wherein the encrypted representation of the second share of the string is encrypted with a public key encryption scheme that is homomorphic with respect to a combining operation.

4. The system of claim 3, wherein the homomorphic public key encryption scheme is semantically secure.

5. The system of claim 2, wherein the processing unit is to encrypt the representation of the first share of the string with a public key encryption scheme that is homomorphic with respect to a combining operation and wherein the decrypted string is computed with a decryption scheme of the public key encryption scheme.

6. The system of claim 2, wherein the processing unit is to compute the representation of the first share of the string by combining the first share of the string with a string of random elements and the representation of the encrypted representation of the second share of the string by encrypting the string of random elements with the homomorphic public key encryption scheme and multiplying the encrypted representation of the second share of the string with the encrypted string of random elements.

7. The system of claim 1, wherein the processing unit is to combine a first string with a second string by transforming the first string into a first bit sequence and the second string into a second bit sequence and using an exclusive OR operation to combine a bit of the first bit sequence with a corresponding bit of the second bit sequence to a corresponding bit of a bit sequence representing a combined string.

8. The system of claim 2, wherein the processing unit is to rearrange the representation of the encrypted representation of the second share of the string and the decrypted string by transforming the representation of the encrypted representation of the second share of the string and the decrypted string into bit sequences and rotating to the left each of the bit sequences by a number of positions that is identical to a number of bits of a bit sequence into which a string is transformed that has a length value identical to the first share of the start value.

9. The system of claim 1, wherein a further first share of the substring is created, the substring being represented by leading elements of a sequence, the sequence being identical to a first sequence representing the further first share combined with a second sequence representing a further second share and the sequence having further elements that are identical to masking elements.

10. A system to contribute to creating a substring of a string, the system comprising:
    a processing unit to, using a processor, encrypt a representation of a second share of the string to generate an encrypted representation of the second share of the string, the second share of the string being combinable with a first share of the string to generate the string; and
    a communication unit to send the encrypted representation of the second share of the string to a further system and receive a rearranged representation of the encrypted representation of the second share of the string;
    the processing unit further to:
        compute a decrypted string by decrypting the rearranged representation of the encrypted representation of the second share of the string,
        rearrange the decrypted string using a second share of a start value of the substring to generate a rearranged decrypted string, the start value being a result of a function of a first share of the start value and the second share of the start value, and
        create a second share of the substring by identifying elements of the second share of the substring with a number of leading elements of the rearranged decrypted string, the substring including a first share of the substring combined with the second share of the substring and the number of leading elements being identical to a second share of a length value of the substring, the length value of the substring being a result of a function of a first share of the length value and the second share of the length value, the string not being revealed to the system.

11. The system of claim 10 wherein the communication unit is to receive an encrypted representation of the first share of the string;
the processing unit is to rearrange a representation of the encrypted representation of the first share of the string using the second share of the start value of the substring to generate a rearranged representation of the encrypted representation of the first share of the string;
and the communication unit is to send the rearranged representation of the encrypted representation of the first share of the string to the further system.

12. The system of claim 11, wherein the processing unit is to encrypt the representation of the second share of the string with a public key encryption scheme that is homomorphic with respect to a combining operation and wherein the processing unit is to compute the decrypted string with a decryption scheme of the public key encryption scheme.

13. The system of claim 12, wherein the homomorphic public key encryption scheme is semantically secure.

14. The system of claim 11, wherein the encrypted representation of the first share of the string is encrypted with a public key encryption scheme that is homomorphic with respect to a combining operation.

15. The system of claim 10, wherein the processing unit is to compute the representation of the second share of the string by combining the second share of the string with a string of random elements and the representation of the encrypted representation of the second share of the string by encrypting the string of random elements with the homomorphic public key encryption scheme and multiplying the encrypted representation of the second share of the string with the encrypted string of random elements.

16. The system of claim 10, wherein the processing unit is to combine a first string with a second string by transforming the first string into a first bit sequence and the second string into a second bit sequence and using an exclusive OR operation to combine a bit of the first bit sequence with a corresponding bit of the second bit sequence to a corresponding bit of a bit sequence representing a combined string.

17. The system of claim 11, wherein the processing unit is to rearrange the representation of the encrypted representation of the first share of the string and the decrypted string by transforming the representation of the encrypted representation of the first share of the string and the decrypted string into bit sequences and rotating to the left each of the bit sequences by a number of positions that is identical to a number of bits of a bit sequence into which a string is transformed that has a length value identical to the second share of the start value.

18. The system of claim 10, wherein a further second share of the substring is created, the substring being represented by leading elements of a sequence, the sequence being identical to a first sequence representing a further first share combined with a second sequence representing the further second share and the sequence having further elements that are identical to masking elements.

19. A method to contribute to creating a substring of a string, the method comprising, at a first party:
receiving an encrypted representation of a second share of the string, the second share of the string being combinable with a first share of the string via a combining operation to generate the string;
rearranging, using a processor, a representation of the encrypted representation of the second share of the string using a first share of a start value of the substring to generate a rearranged representation of the encrypted representation of the second share of the string, the start value a result of a function of the first share of the start value and a second share of the start value, the string not being revealed to a second party;
sending the rearranged representation of the encrypted representation of the second share of the string to the second party;
computing a decrypted string by decrypting a rearranged representation of an encrypted representation of the first share of the string;
rearranging the decrypted string using the first share of the start value of the substring to generate a rearranged decrypted string; and
creating a first share of the substring by identifying elements of the first share of the substring with a number of leading elements of the rearranged decrypted string, the first share of the substring being combinable with a second share of the substring via a combining operation to generate the substring, the number of leading elements being identical to a first share of a length value of the sub string, the length value of the sub string being a result of a function of the first share of the length value and a second share of the length value.

20. The method of claim 19 further comprising, at the first party:
encrypting the representation of the first share of the string to generate the encrypted representation of the first share of the string;
sending the encrypted representation of the first share of the string to the second party;
receiving the rearranged representation of the encrypted representation of the first share of the string.

21. The method of claim 20, wherein encrypting the representation of the first share of the string comprises using a public key encryption scheme that is homomorphic with respect to a combining operation and wherein computing the decrypted string comprises using a decryption scheme of the public key encryption scheme.

22. The method of claim 21, wherein the homomorphic public key encryption scheme is semantically secure.

23. The method of claim 21, further computing the representation of the first share of the string by combining the first share of the string with a string of random elements and computing the representation of the encrypted representation of the second share of the string by encrypting the string of random elements using the homomorphic public key encryption scheme and multiplying the encrypted representation of the second share of the string with the encrypted string of random elements.

24. The method of claim 19, wherein the second share of the string is combined with the first share of the string by transforming the second share into a first bit sequence and the first share into a second bit sequence and using an exclusive OR operation to combine a bit of the first bit sequence with a corresponding bit of the second bit sequence to a corresponding bit of a bit sequence representing a combined string.

25. The method of claim 20, wherein the rearranging of the representation of the encrypted representation of the second share of the string and the decrypted string comprises transforming the representation of the encrypted representation of the second share of the string and the decrypted string into bit sequences and rotating to the left each of the bit sequences by a number of positions that is identical to a number of bits of a bit sequence into which a string is transformed that has a length value identical to the first share of the start value.

26. The method of claim 19, comprising creating a further first share of the substring, the substring being represented by leading elements of a sequence, the sequence being identical to a first sequence representing the further first share combined with a second sequence representing a further second share and the sequence having further elements that are identical to masking elements.

27. A method to contribute to creating a substring of a string, the method comprising, at a second party:
encrypting, using a processor, a representation of a second share of the string to generate an encrypted representation of the second share of the string, the second share of the string being combinable with a first share of the string via a combining operation to generate the string;
sending the encrypted representation of the second share of the string to a first party;
receiving a rearranged representation of the encrypted representation of the second share of the string;
computing a decrypted string by decrypting the rearranged representation of the encrypted representation of the second share of the string;
rearranging the decrypted string using a second share of a start value of the substring to generate a rearranged decrypted string, the start value being a result of a function of a first share of the start value and the second share of the start value; and
creating a second share of the substring by identifying elements of the second share of the substring with a number of leading elements of the rearranged decrypted string, a first share of the substring being combinable with the second share of the substring via a combining operation to generate the substring, the number of leading elements being identical to a second share of a length value of the substring, the length value of the substring being a result of a function of a first share of the length value and the second share of the length value, the string not being revealed to the second party.

28. The method of claim 27 further comprising, at the second party:
receiving an encrypted representation of the first share of the string;
rearranging a representation of the encrypted representation of the first share of the string using the second share of the start value of the substring to generate a rearranged representation of the encrypted representation of the first share of the string; and
sending the rearranged representation of the encrypted representation of the first share of the string to the first party.

29. The method of claim 27, wherein the encrypting of the representation of the second share of the string comprises using a public key encryption scheme that is homomorphic with respect to a combining operation and wherein computing the decrypted string comprises using a decryption scheme of the public key encryption scheme.

30. The method of claim 29, wherein the homomorphic public key encryption scheme is semantically secure.

31. The method of claim 29, further computing the representation of the second share of the string by combining the second share of the string with a string of random elements and computing the representation of the encrypted representation of the second share of the string by encrypting the string of random elements using the homomorphic public key encryption scheme and multiplying the encrypted representation of the second share of the string with the encrypted string of random elements.

32. The method of claim 27, wherein the second share of the string is combined with the first share of the string by transforming the second share of the string into a first bit sequence and the first share of the string into a second bit sequence and using an exclusive OR operation to combine a bit of the first bit sequence with a corresponding bit of the second bit sequence to a corresponding bit of a bit sequence representing a combined string.

33. The method of claim 28, wherein the rearranging of the representation of the encrypted representation of the first share of the string and the decrypted string comprises transforming the representation of the encrypted representation of the first share of the string and the decrypted string into bit sequences and rotating to the left each of the bit sequences by a number of positions that is identical to a number of bits of a bit sequence into which a string is transformed that has a length value identical to the second share of the start value.

34. The method of claim 27, creating a further second share of the substring, the substring being represented by leading elements of a sequence, the sequence being identical to a first sequence representing the further first share combined with a second sequence representing a further second share and the sequence having further elements that are identical to masking elements.

35. A non-transitory machine-readable medium comprising instructions that, when executed by one or more processors of a machine, causes the machine to perform a method, the method comprising:
receiving an encrypted representation of the second share of the string, the second share of the string being combinable with a first share of the string via a combining operation to generate the string, the module to send a rearranged representation of the encrypted representation of the second share of the string to a further system; and
rearranging a representation of the encrypted representation of the second share of the string using a first share of a start value of the substring, the start value being a result of a function of the first share of the start value and a second share of the start value, the string not being revealed to a module;
computing a decrypted string by decrypting a rearranged representation of an encrypted representation of the first share of the string;
rearranging the decrypted string using the first share of the start value of the sub string to generate a rearranged decrypted string; and
creating a first share of the sub string by identifying elements of the first share of the sub string with a number of leading elements of the rearranged decrypted string, the first share of the substring being combinable with a second share of the substring via a combining operation to generate the substring, the number of leading elements being identical to a first share of a length value of the sub string, the length value of the sub string being a result of a function of the first share of the length value and a second share of the length value.

36. A non-transitory machine-readable medium comprising instructions that, when executed by one or more processors of a machine, causes the machine to perform a method, the method comprising:
encrypting a representation of a second share of the string to generate an encrypted representation of a second share of the string, the second share of the string being combinable with a first share of the string via a combining operation to generate the string,
computing a decrypted string by decrypting a rearranged representation of the encrypted representation of the second share of the string,
rearranging the decrypted string using a second share of a start value of the sub string to generate a rearranged decrypted string, the start value being a result of a function of a first share of the start value and the second share of the start value, creating a second share of the substring by identifying elements of the second share of the substring with a number of leading elements of the rearranged decrypted string, a first share of the substring being combinable with the second share of the substring via a combining operation to generate the sub string, the number of leading elements being identical to a second share of a length value of the sub string, the length value of the sub string being a result of a function of a first share of the length value and the second share of the length value, the string not being revealed to a first module;

sending the encrypted representation of the second share of the string to a further system; and receiving the rearranged representation of the encrypted representation of the second share of the string.

* * * * *